US011222208B2

(12) United States Patent
Sun et al.

(10) Patent No.: US 11,222,208 B2
(45) Date of Patent: Jan. 11, 2022

(54) PORTRAIT IMAGE EVALUATION BASED ON AESTHETICS

(71) Applicant: Futurewei Technologies, Inc., Plano, TX (US)

(72) Inventors: Hongyu Sun, Sammamish, WA (US); Wei Su, Remond, WA (US); Xiaoxing Zhu, Bellevue, WA (US); Fan Zhang, Sammamish, WA (US)

(73) Assignee: Futurewei Technologies, Inc., Plano, TX (US)

( * ) Notice: Subject to any disclaimer, the term of this patent is extended or adjusted under 35 U.S.C. 154(b) by 5 days.

(21) Appl. No.: 16/131,681

(22) Filed: Sep. 14, 2018

(65) Prior Publication Data

US 2020/0019784 A1    Jan. 16, 2020

Related U.S. Application Data

(63) Continuation-in-part of application No. 16/034,693, filed on Jul. 13, 2018.

(51) Int. Cl.
*G06K 9/00* (2006.01)
*G06K 9/62* (2006.01)

(52) U.S. Cl.
CPC ..... *G06K 9/00677* (2013.01); *G06K 9/00228* (2013.01); *G06K 9/00362* (2013.01); *G06K 9/623* (2013.01)

(58) Field of Classification Search
CPC .. G06K 9/00362; G06K 9/623; G06K 9/6256; G06F 16/5838; G06N 20/00
USPC ........................................................ 382/159
See application file for complete search history.

(56) References Cited

U.S. PATENT DOCUMENTS

| | | | |
|---|---|---|---|
| 9,373,057 B1 * | 6/2016 | Erhan | G06K 9/6202 |
| 10,402,632 B2 * | 9/2019 | Bourdev | G06K 9/6292 |
| 2007/0271524 A1 * | 11/2007 | Chiu | G06F 16/44 715/767 |
| 2008/0260255 A1 * | 10/2008 | Fukushima | G06K 9/00228 382/190 |
| 2010/0189356 A1 | 7/2010 | Sugita | |
| 2011/0075917 A1 | 3/2011 | Cerosaletti et al. | |

(Continued)

FOREIGN PATENT DOCUMENTS

| | | | | |
|---|---|---|---|---|
| CN | 101790047 A | * | 7/2010 | ........... H04N 1/2145 |
| CN | 101790047 A | | 7/2010 | |

(Continued)

OTHER PUBLICATIONS 32 tips and tricks for Google Photos Got Google Photos? This guide will help you get around the service like a pro. By JR Raphael Contributing Editor, Computerworld (Year: 2016).*

(Continued)

*Primary Examiner* — Amandeep Saini
(74) *Attorney, Agent, or Firm* — Conley Rose, P.C.

(57) ABSTRACT

A method implemented by computing device, the method comprising determining, by the computing device, a plurality of attributes each respectively describing a region of interest corresponding to a body part of a person displayed in an image, determining, by the computing device, a respective score for each of the plurality of attributes, and computing, by the computing device, an aggregate score based on the respective scores of the plurality of attributes.

36 Claims, 17 Drawing Sheets

(56) References Cited

U.S. PATENT DOCUMENTS

| | | | |
|---|---|---|---|
| 2011/0194761 | A1 | 8/2011 | Wang et al. |
| 2012/0035927 | A1* | 2/2012 | Yamada ................. G10L 25/78 704/242 |
| 2012/0269425 | A1* | 10/2012 | Marchesotti ........... G06K 9/036 382/159 |
| 2013/0156321 | A1 | 6/2013 | Motoi et al. |
| 2014/0029808 | A1 | 1/2014 | Lee |
| 2014/0153832 | A1 | 6/2014 | Kwatra et al. |
| 2015/0169633 | A1 | 6/2015 | Yee et al. |
| 2015/0294193 | A1* | 10/2015 | Tate ................... G06K 9/00785 382/159 |
| 2016/0239711 | A1* | 8/2016 | Gong ................ G06K 9/00295 |
| 2017/0032481 | A1* | 2/2017 | D'Souza ................. G06K 9/46 |
| 2017/0294010 | A1 | 10/2017 | Shen et al. |
| 2018/0018508 | A1* | 1/2018 | Tusch ................ G06K 9/00771 |
| 2018/0150722 | A1* | 5/2018 | Du ........................ H04N 5/262 |
| 2019/0147305 | A1* | 5/2019 | Lu ........................ G06F 16/583 382/157 |
| 2019/0258722 | A1 | 8/2019 | Guo et al. |

FOREIGN PATENT DOCUMENTS

| | | | |
|---|---|---|---|
| CN | 104834898 | A | 8/2015 |
| CN | 107644213 | A | 1/2018 |
| WO | 2012135372 | A2 | 10/2012 |

OTHER PUBLICATIONS

Krizhevsky, et al., "ImageNet Classification with Deep Convolutional Neural Networks," Advances in Neural Information Processing Sytsems, 24(2); Jan. 2012, 9 pages.

Ren, et al., "Faster R-CNN: Towards Real-Time Object Detection with Region Proposal Networks," IEEE Transactions on Pattern Analysis and Machine Intelligence, vol. 39, No. 6, Jun. 2017, pp. 1137-1149.

Machine Translation and Abstract of Chinese Publication No. CN104834898, Aug. 12, 2015, 18 pages.

Machine Translation and Abstract of Chinese Publication No. CN107644213, Jan. 30, 2018, 19 pages.

Foreign Communication From A Counterpart Application, PCT Application No. PCT/CN2019/095032, English Translation of International Search Report dated Oct. 9, 2019, 6 pages.

Foreign Communication From A Counterpart Application, PCT Application No. PCT/CN2019/095032, English Translation of Written Opinion dated Oct. 9, 2019, 4 pages.

Gorodnichy, D., et al., "Target-based evaluation of face recognition technology for video surveillance applications," 2014 IEEE Symposium on Computational Intelligence in Biometrics and Identity Management (CIBIM), Dec. 1, 2014, XP55324437, 8 pages.

* cited by examiner

PORTRAIT IMAGE EVALUATION BASED ON AESTHETICS

CROSS-REFERENCE TO RELATED APPLICATIONS

This application is a continuation-in-part of U.S. Non-Provisional application Ser. No. 16/034,693, filed Jul. 13, 2018, which is incorporated by reference herein in its entirety and for all purposes.

FIELD OF INVENTION

The present disclosure pertains to the image analysis. In particular, the present disclosure relates generally to performing image analysis at a device based on aesthetic features of the image.

BACKGROUND

Traditional devices, such as smartphones, mobile tablets, digital cameras, and camcorders, may be used to capture images and videos. These devices may be capable of altering objective features of the image, such as, for example, a shade, color, brightness, and texture of pixels of the image. For example, users of these devices may manually edit the objective features of the image using a filter that typically changes the appearance of the image or part of the image. However, manually editing an image is time consuming and sometimes detracts from the original aesthetic appeal or value of the image.

An aesthetic value or appeal of an image refers to how a user subjectively responds to viewing an image or a video. In this way, the aesthetic value of an image may be based on objective features as well as subject features of the image. Traditional image capturing devices are only capable of determining the objective features of an image, such as, for example, a brightness, contrast, saturation, sharpness, hue, and tint of the pixels in the image. However, an aesthetic value of an image may not only be based on the objective features of the image, but may also be based on subjective features of the image or features regarding people displayed within the image.

SUMMARY

According to one aspect of the present disclosure, there is provided a method implemented by a computing device. The method comprises determining, by the computing device, a plurality of attributes each respectively describing a region of interest corresponding to a body part of a person displayed in an image, determining, by the computing device, a respective score for each of the plurality of attributes, and computing, by the computing device, an aggregate score based on the respective scores of the plurality of attributes.

Optionally, in any of the preceding aspects, another implementation of the aspect provides that the person is determined in response to receiving a selection of the person displayed in the image, the image displaying the person and a plurality of other people.

Optionally, in any of the preceding aspects, another implementation of the aspect provides that the person is determined based on a face of the person that is detected in the image.

Optionally, in any of the preceding aspects, another implementation of the aspect provides that the respective score for each of the plurality of attributes is determined based on trained data that comprises a plurality of pre-defined scores for each of the plurality of attributes.

Optionally, in any of the preceding aspects, another implementation of the aspect provides that the trained data comprises a plurality of mappings that respectively map one of the plurality of pre-defined scores with one of a plurality of pre-defined attributes.

Optionally, in any of the preceding aspects, another implementation of the aspect provides that the image is one of a plurality of images included in a video, and the method further comprises determining, by the computing device, one or more of the plurality of images that include the person, and combining, by the computing device, the one or more of the plurality of images that include the person to create a summarization video for the person, wherein the plurality of images included in the summarization video are selected based on the aggregate score of each of the plurality of images, and wherein the aggregate score is computed based on attributes of the person.

Optionally, in any of the preceding aspects, another implementation of the aspect provides that the aggregate score is computed based on generic attributes and positional attributes of the person.

Optionally, in any of the preceding aspects, another implementation of the aspect provides that, when the image displays the person and a plurality of other people, the method further comprises determining, by the computing device, a score for a background of the image, wherein the background of the image includes the plurality of other people, wherein the aggregate score is computed further based on the score for the background of the image.

Optionally, in any of the preceding aspects, another implementation of the aspect provides that the method further comprises searching, by the computing device, for the regions of interest corresponding to different body parts of the person portrayed in the image based on a likelihood that the body part is positioned at a location within the image.

Optionally, in any of the preceding aspects, another implementation of the aspect provides that the searching for the regions of interest comprises searching for the regions of interest based on trained data, wherein the trained data comprises a pre-defined anchor that points to a specific portion or point in the image.

Optionally, in any of the preceding aspects, another implementation of the aspect provides that the searching for the regions of interest comprises searching for the region of interest corresponding to at least one of eyes of the person, a nose of the person, or a mouth of the person based on a location of a face of the person in the image.

Optionally, in any of the preceding aspects, another implementation of the aspect provides that a plurality of pre-defined scores are respectively stored for a plurality of attributes, and wherein determining the respective score for each of the plurality of attributes comprises searching trained data for a pre-defined score that corresponds to an attribute determined for the region of interest.

Optionally, in any of the preceding aspects, another implementation of the aspect provides that the plurality of attributes comprise a plurality of positional attributes respectively describing positional information corresponding to the regions of interest.

Optionally, in any of the preceding aspects, another implementation of the aspect provides that the plurality of attributes comprise a plurality of generic attributes for the person portrayed in the image, wherein the plurality of generic attributes describe generic qualities of the person.

Optionally, in any of the preceding aspects, another implementation of the aspect provides that, when the image portrays more than one person, the method further comprises determining, by the computing device, a respective score for each of a plurality of group attributes, wherein the plurality of group attributes respectively describes at least one of a relationship between a plurality of other people portrayed in the image, a space between each of the plurality of other people portrayed in the image, a gesture performed by one or more of the plurality of other people in the image, or an arrangement of the plurality of other people portrayed in the image, wherein the aggregate score is further computed based on each of the respective scores of the plurality of group attributes.

Optionally, in any of the preceding aspects, another implementation of the aspect provides that a weight is associated with each of the plurality of attributes, wherein the weight for the respective attribute is applied to the respective score for the respective attribute to create a weighted score for the respective attribute, and wherein the aggregate score is computed based on an aggregation of each of the weighted scores for each of the respective attributes.

According to one aspect of the present disclosure, there is provided a method implemented by computing device. The method comprises determining, by the computing device, one or more of a plurality of images that include a person from a video, and combining, by the computing device, the one or more of the plurality of images that include the person to create a summarization video for the person.

Optionally, in any of the preceding aspects, another implementation of the aspect provides that the method further comprises receiving, by the computing device, a selection of the person.

Optionally, in any of the preceding aspects, another implementation of the aspect provides that the person is determined in response to detecting a face of the person in the one or more of the plurality of images.

Optionally, in any of the preceding aspects, another implementation of the aspect provides that the one or more of the plurality of images including the person are determined based on an aggregate score of each of the plurality of images.

Optionally, in any of the preceding aspects, another implementation of the aspect provides that the aggregate score is computed based on a plurality of attributes each respectively describing a region of interest corresponding to a body part of the person.

Optionally, in any of the preceding aspects, another implementation of the aspect provides that the plurality of attributes of the person comprises a plurality of positional attributes respectively describing positional information corresponding to the regions of interest.

Optionally, in any of the preceding aspects, another implementation of the aspect provides that the plurality of attributes of the person comprise a plurality of generic attributes for the person, wherein the plurality of generic attributes describe generic qualities of the person.

Optionally, in any of the preceding aspects, another implementation of the aspect provides that the plurality of images that include the person is determined based on a first plurality of attributes each respectively describing a region of interest corresponding to a body part of the person and a second plurality of attributes that each has lower weight than the first plurality of attributes.

Optionally, in any of the preceding aspects, another implementation of the aspect provides that the method further comprises creating, by the computing device, a thumbnail representing the summarization video for the person, wherein the thumbnail comprises an image showing a face of the person, and displaying, by the computing device, the thumbnail.

Optionally, in any of the preceding aspects, another implementation of the aspect provides that the one or more of the plurality of images that include the person are combined by adding one or more transition images into the one or more of the plurality of images.

Optionally, in any of the preceding aspects, another implementation of the aspect provides that the summarization video is created automatically as background activity of the computing device.

Optionally, in any of the preceding aspects, another implementation of the aspect provides that the method further comprises displaying, by the computing device, a notification to indicate that the summarization video is creating or has been created.

According to one aspect of the present disclosure, there is provided an apparatus implemented as a computing device. The apparatus comprises memory storage comprising instructions, and one or more processors in communication with the memory storage, the one or more processors execute the instructions to determine a plurality of attributes each respectively describing a region of interest corresponding to a body part of a person displayed in an image, determine a respective score for each of the plurality of attributes, and compute an aggregate score based on the respective scores of the plurality of attributes.

Optionally, in any of the preceding aspects, another implementation of the aspect provides that the person is determined in response to receiving a selection of the person displayed in the image, the image displaying the person and a plurality of other people.

Optionally, in any of the preceding aspects, another implementation of the aspect provides that the person is determined based on a face of the person that is detected in the image.

Optionally, in any of the preceding aspects, another implementation of the aspect provides that the respective score for each of the plurality of attributes is determined based on trained data that comprises a plurality of predefined scores for each of the plurality of attributes.

Optionally, in any of the preceding aspects, another implementation of the aspect provides that the one or more processors further execute the instructions to search for the regions of interest corresponding to different body parts of the person portrayed in the image based on a likelihood that the body part is positioned at a location within the image.

Optionally, in any of the preceding aspects, another implementation of the aspect provides that, when the image portrays more than one person, wherein the one or more processors further execute the instructions to determine a respective score for each of a plurality of group attributes, wherein the plurality of group attributes respectively describes at least one of a relationship between a plurality of other people portrayed in the image, a space between each of the plurality of other people portrayed in the image, a gesture performed by one or more of the plurality of other people in the image, or an arrangement of the plurality of other people portrayed in the image, wherein the aggregate score is further computed based on each of the respective scores of the plurality of group attributes.

According to one aspect of the present disclosure, there is provided an apparatus implemented as a computing device. The apparatus comprises memory storage comprising instructions, and one or more processors in communication with the memory storage, the one or more processors execute the instructions to determine one or more of a plurality of images that include a person from a video, and combine the one or more of the plurality of images that include the person to create a summarization video for the person.

Optionally, in any of the preceding aspects, another implementation of the aspect provides that the one or more processors further execute the instructions to receive a selection of the person.

Optionally, in any of the preceding aspects, another implementation of the aspect provides that the one or more processors further execute the instructions to detect a face of the person in the one or more of the plurality of images, and wherein the person is determined in response to detecting the face of the person.

Optionally, in any of the preceding aspects, another implementation of the aspect provides that the one or more of the plurality of images including the person are determined based on an aggregate score of each of the plurality of images.

Optionally, in any of the preceding aspects, another implementation of the aspect provides that the aggregate score is computed based on a plurality of attributes each respectively describing a region of interest corresponding to a body part of the person.

Optionally, in any of the preceding aspects, another implementation of the aspect provides that the one or more processors further execute the instructions to create a thumbnail representing the summarization video for the person, wherein the thumbnail comprises an image showing a face of the person; and cause a display device to display the thumbnail.

Optionally, in any of the preceding aspects, another implementation of the aspect provides that the summarization video is created automatically as background activity of the computing device.

Optionally, in any of the preceding aspects, another implementation of the aspect provides that the summarization video is created automatically when the computing device is charging.

The embodiments disclosed herein enable computing devices to automatically determine an aesthetic value of an image based on an aggregate score that is computed for the image. Computing devices that automatically determine the aesthetic value of images may use processing resources and storage resources more efficiently and effectively. For example, computing devices that compute aggregate scores for images do not need to unnecessarily waste processing power or resources on manually editing images. In addition, computing devices that compute aggregate scores for images may be configured to maintain storage of the higher quality, rather than unnecessarily wasting storage resources on the low quality images.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
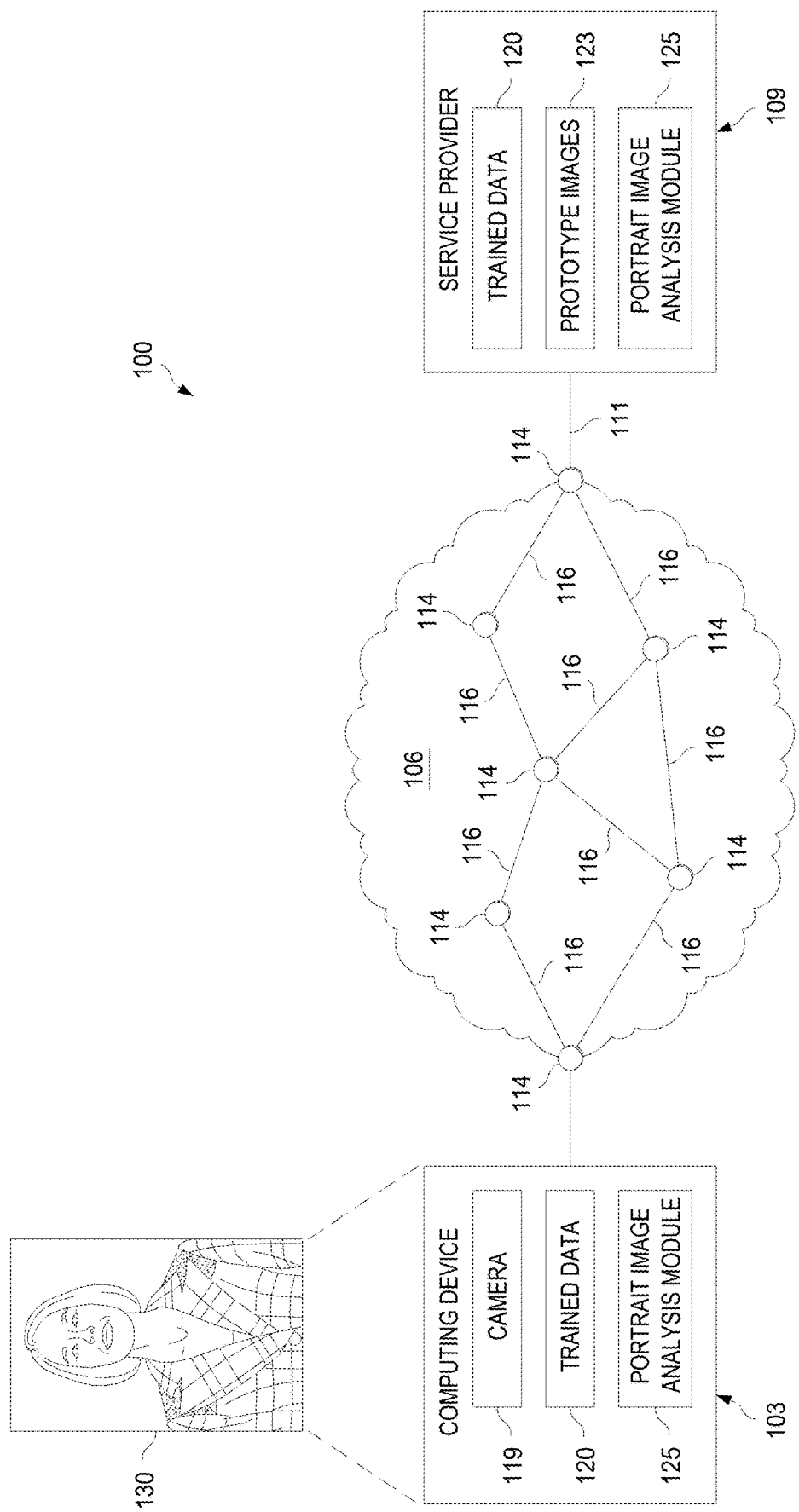
FIG. 1 is a diagram of a system configured to implement portrait image evaluation according to various embodiments.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

A subjective feature of an image may refer to a quality of certain attributes or properties of person subjects in the image. A subjective feature of the image may be a facial expression of a person portrayed in the image. Another example of a subjective feature of an image may be an arrangement of multiple people depicted in the image. In some cases in which people are portrayed in an image, an aesthetic value of the image may largely depend on the subjective features of the people depicted in the image. An image in which everyone depicted in the image is smiling is more aesthetically valuable than an image in which someone is not prepared for the photo being taken. However, devices may not be capable of determining an aesthetic value of an image based on subjective features of the image that define attributes of the people portrayed in the image. In addition, devices may also not be capable of determining an aesthetic value of an image based on subjective features of a particular person in the image, while ignoring the subjective features of other people depicted in the image.

In an embodiment, a computing device may store numerous videos and images, in which a video consists of a sequence of multiple images. In an embodiment, an image or an image within a video may depict multiple different people as the main feature of the image, and this type of image is referred to herein as a multi-person portrait image. For multi-person portrait images, an aggregate score may be calculated for the image based on group attributes for all of the people depicted in the image and feature attributes for each person depicted in the image. Group attributes may refer to characteristics that describe the relationship between the multiple people in the image or a spatial arrangement between the multiple people in the image, as will be further described below. Feature attributes may refer to actual characteristics of a person depicted in the image (such as, for example, an emotion or expression of the face of the person), as will be further described below. However, in some cases, a multi-person portrait image may need to be scored based on a particular person in the image without considering features of the other people depicted in the image.

Disclosed herein are embodiments directed to performing portrait image evaluation for a protagonist (e.g., one person as the central focus) in an image analyzing attributes of a selected person depicted in a multi-person portrait image to determine an aesthetic value of the image. In an embodiment in which an image includes multiple different people, a user may select a particular person for the purpose of scoring the image. Similarly, when a video includes multiple different people, a user may select a particular person for the purpose of scoring the video. For example, each of the images within the video may be scored based on the subjective features of the selected person without considering the subjective features of the other people depicted in each image of the video. The other people depicted by the image may be scored for objective factors, such as color, saturation, blurriness, etc.

In an embodiment, a user may also select a particular person for the purpose of generating a summarization video for that particular person using an original video. A summarization video may be a video that includes one or more of the images within the original video depicting the selected person. Each of the images included in the summarization video for a selected person may be based on a score of the image, which is calculated based on the selected person and a length of time of the summarization video. The summarization video may be made for any of the different people portrayed in the original video.

FIG. 1 is a diagram of a system 100 configured to implement portrait image evaluation according to various embodiments. System 100 may comprise a computing device 103, a network 106, and a service provider 109 interconnected by links 111. As should be appreciated, system 100 may include other components. System 100 may be configured to develop, package, and send the software components used to perform portrait image analysis to the computing device 103.

The network 106 is a network infrastructure that comprises a plurality of network nodes 114 that interconnects the computing device 103 and the service provider 109. The network 106 may be a packet network configured to support transporting of both the software components and data that may be used to perform portrait image analysis according to the embodiments disclosed herein. The network 106 is configured to implement network configurations to configure flow paths or virtual connections between the computing device 103 and the service provider 109. The network 106 may be a backbone network that connects the service provider 109 to the computing device 103. The network 106 may also connect the service provider 109 and the computing device 103 to other systems such as the external Internet, other cloud computing systems, data centers, and any other entity that accesses the service provider 109.

The network nodes 114 may be routers, bridges, gateways, virtual machines, and/or any other type of node that is configured for packet forwarding. The network nodes 114 may be interconnected using links 116. The links 116 may be virtual links, which are logical paths between the network nodes 114, or physical links. The network nodes 114 may be interconnected using any suitable virtual link or physical link as should be appreciated by one of ordinary skill in the art. Links 111 may be wired or wireless links interconnecting an edge network node 114 positioned at the edge of network 106 with the service provider 109 and the computing device 103.

The computing device 103 may be a user device, such as, for example, a mobile phone, mobile tablet, wearable device, Internet of Things (IoT) device, or personal computer. In some embodiments, the computing device 103 may be a device capable of capturing images or videos using, for example, a camera 119 or any other image capturing device. In some embodiments, the computing device 103 may not include a camera, but may otherwise be able to perform portrait image analysis according to the embodiments disclosed herein using images received from other devices or from storage.

The service provider 109 may be one or more devices or servers that provide services to the computing device 103 via network 106. In system 100, the service provider 109 may be configured to create trained data 120, a portrait image analysis module 125 may perform portrait image analysis. In some embodiments, the trained data 120 may be data that is generated based on an analysis of a large number of professional quality prototype images 123. The service provider 109 may store a collection of hundreds or thousands of professional quality prototype images 123. The prototype images 123 may be portrait images depicting one or more people. A portrait image may be an image in which one or more people are portrayed as the most significant feature of the image, as opposed to a landscape or background being a significant feature of the image.

The prototype images 123 may be divided in multiple person related trained sets. Each person related trained set may include images taken by a single photographer using the same camera with the same photo quality. Each of the images in a person related trained set may have the same people portrayed in the images and may have the same number of people portrayed in the images. In some cases, each of the images in the person related trained set may contain a single topic or scene. In some cases, each of the images in a person the person related trained set may have multiple portrait compositions in which multiple different emotions and gestures are shown by each person portrayed in the image.

For example, a person related trained set may have a minimum threshold number of images. Each of the images in the person related trained set may show the same people performing different actions and having different emotions. Similarly, each image in the person related trained set may show the people from various different angles and scales. The prototype images 123 may include thousands of person related trained sets. In this way, each of the images in a person related trained set may be used to determine accurate pre-defined scores for various attributes of a person, as will be further described below.

The trained data 120 includes data that is determined using the prototype images 123 and may be subsequently used by the computing device 103 to perform portrait image analysis of an image 130 being currently analyzed. In some embodiments, the trained data 120 may include pre-defined scores that are mapped to certain attributes, scoring rules that may be applied assigned to certain attributes, and pre-defined weights that are assigned to certain attributes.

The pre-defined scores may be determined by users or professional photographers based on an analysis of how certain attributes of the person contribute to an aesthetic value of multiple prototype images 123. For example, each of the prototype images 123 (or each of the images in the different person related trained sets) is examined to determine pre-defined scores for the attributes shown in each of the images. An attribute of the person portrayed in the image refers to a feature or a region of interest of the person (e.g., face, mouth, eyes) in the image, as will be further described below. A pre-defined score may be a value that rates an attribute of an image on a scale (such as from 0 to 1 or 1 to 10), which reflects how the attribute contributes to the overall aesthetic value of the prototype image 123. As an illustrative example, suppose that for the eyes (e.g., region of interest) of a person shown in an image, an attribute may describe whether the person in the image has their eyes open or closed. In this case, the pre-defined score for the attribute having open eyes may be 1, while the pre-defined score for the attribute having closed eyes may be 0, where the pre-defined score of 1 represents a higher quality attribute than the pre-defined score of 0.

In an embodiment, the pre-defined score for an attribute may be based on multiple pre-defined scores for the attribute that are manually determined from multiple different professional photographers or users at the service provider 109. The pre-defined scores for an attribute from each of the different professional photographers may be averaged together to be the pre-defined score for the attribute that is stored in the trained data 120. For example, suppose that an angle of a face of the person shown in the image contributes to the aesthetic value of the image. In this case, the face (e.g., region of interest) of many different prototype images 123 having many different face angles (e.g., attributes) may be analyzed by the photographers to determine many different pre-defined scores for each face angle that is shown in the prototype images 123. These pre-defined scores may be averaged to create a single pre-defined score for each face angle, which is then stored in the trained data 120. In an embodiment, pre-defined scores generated for similar attributes may be averaged together to create a single pre-defined score for the attribute.

The scoring rules may be rules that are used with the pre-defined scores to determine a score for a region of interest or an attribute of an image being analyzed. In an embodiment, a scoring rule may be values that are computed and considered during the determination of a score for a region of interest of an image being analyzed. For example, the scoring rules may be used for attributes or regions of interest that may not have a matching pre-defined score that matches exactly with the attribute or region of interest being scored. Additional details regarding the scoring rules will be further described below.

There may be many different types of attributes that describe the person portrayed in the various prototype images 123. The attributes that may be identified for each person depicted in the image may include feature attributes, positional attributes, generic attributes, group attributes, action behavior attributes, and various other types of attributes.

In an embodiment, a feature attribute may describe the expressions or emotions of the person being portrayed. A feature attribute may refer to whether the person portrayed in the image is smiling or not, and this feature attribute may be determined by analyzing the mouth (e.g., region of interest) of the person in each of the prototype images 123. Based on this analysis, a relative and pre-defined score may be assigned to each of the different types of mouth expressions that are portrayed in the prototype images 123. The mouth segment portraying a smiling person may receive the highest score of 1, and a mouth segment portraying someone who is not smiling may receive a lowest score of 0. The trained data 120 may store the pre-defined scores for each of the different feature attributes.

In an embodiment, a positional attribute describes a position or location of the person within the image or a position or location of the various body parts of the person within the image. The positional attributes may include an angle of the body, an angle of the face, a body scale of the person within the image, or a position of the arms or legs of the body.

In some of the embodiments, each of the different positional attributes may also be assigned a pre-defined score. The pre-defined score for the positional attributes may be determined by analyzing numerous prototype images 123 and then relating how the positional attributes in each of these prototype images 123 affects the aesthetic value of the image. The trained data 120 may store a pre-defined score for each of the different variations of the positional attribute.

In an embodiment, a generic attribute includes a general description of the person portrayed in the image, such as, for example, a gender, an age range, or a race of the person. The generic attributes may or may not be assigned a score. However, the generic attributes may be used to determine a pre-defined weight for certain attributes, as will be further described below in FIGS. 7 and 9. The determination of pre-defined weights for the segments and the attributes may be determined in a manner similar to which the pre-defined scores are determined, such as by analyzing multiple prototype images 123 to determine a proportion of how certain generic attributes affect the aesthetic value of an image.

In an embodiment, an action behavior attribute refers to a characterization of an action or a motion performed by the person portrayed in the prototype images 123. An action behavior attribute may describe whether the person is posing, running, sitting, standing, playing, falling, or jumping. Action behavior attributes may also be characterizations of specific actions performed by a single body part of the person. For example, an action behavior attribute can refer to whether the person has an open hand or a closed hand.

The action behavior attributes may also be assigned a pre-defined score in a manner similar to which the segments, attributes, and positional attributes are assigned a pre-defined score. The score for the action behavior attributes may also be determined by analyzing numerous prototype images 123 and then relating how each of the action behavior attributes in each of these prototype images 123 affects the aesthetic value of the image. The trained data 120 may store the pre-defined scores for each of the different action behavior attributes.

In some embodiments, such as where the image portrays more than one person, pre-defined scores for group attributes may describe a relationship between each person displayed in the prototype images 123. A group attribute may be a spatial relationship of each person portrayed in the image or an arrangement of each person in the image. The trained data 120 may store the pre-defined scores for each of the group attributes.

In this way, the service provider 109 is configured store different pre-defined scores for all the different attributes of the different people that may be depicted in an image based on an analysis of one or more different prototype images 123. The trained data 120 comprises the pre-defined scores for all the different variations of attributes for a region of interest that may be depicted in the prototype images 123. The trained data 120 may also store all the different pre-defined weights for each of the generic attributes and other weights that may be used to determine the aggregate score for images 130 that are currently being analyzed by a computing device. In some embodiments, the trained data 120 may comprise descriptive data for each of the pre-defined scores such that computing devices 103 may use the descriptive data to match the attributes identified at the computing device 103 for the image 130 with the descriptive data of the pre-defined scores for the prototype images 123 in the trained data 120. In an embodiment, the descriptive data may include mappings between the pre-defined scores and the attributes of the prototype images 123.

In an embodiment, the computing device 103 may store the trained data 120 and implement the portrait image analysis module 125. As will be further described below with reference to FIGS. 3-10, the portrait image analysis module 125 may be configured to identify segments corresponding to different regions of interest in the image 130 that is currently being analyzed (this may also be referred to as the detector phase). A segment is a rectangle that encloses the region of interest of an image. Examples of segments are shown and described below with reference to FIGS. 4A-B. Identifying segments within the image 130 may be performed using various methods for detecting objects within an image 130, such as region-based convolutional neural networks (R-CNN) or faster R-CNN. Faster R-CNN is further described in the Institute of Electrical and Electronics Engineers (IEEE) document entitled "Faster R-CNN: Towards Real-Time Object Detection with Region Proposal Networks," by Shaoqing Ren, et. al., dated June 2017 (herein after referred to as the Faster R-CNN document), which is hereby incorporated by reference in its entirety.

After identifying the segments of the image 130, the portrait image analysis module 125 may analyze each segment to determine attributes describing the region of interest corresponding to the segments. As described above, the attributes may be person feature attributes, positional attributes, group attributes, generic attributes, action behavior attributes or any other type of attribute that may be identified by analyzing the image 130. Determining the various attributes within the image 130 may be performed using various methods for detecting objects within an image 130, such as R-CNN or faster R-CNN.

The process of segmenting the image 130 and identifying attributes within the image 130 may be performed in various different ways using various different layers, such as a convolution layer, a fully connected layer, and a loss layer, each which is further described in the Faster R-CNN document.

Subsequent to determining the attributes, the portrait image analysis module 125 may then score each of the attributes based on the trained data 120. In one embodiment, the computing device 103 may scan the descriptive data in the trained data 120 to find a description corresponding to an attribute that matches the attribute identified by the segment in the image. When a matching description is found, the computing device 103 may retrieve the pre-defined score that corresponds to the matching description, and then determine that the score for the segment is the pre-defined score.

In one embodiment, for location based attributes, the computing device 103 may use the pre-defined scores for descriptions that describe similar location based attributes and then perform, for example, a regression analysis using the scoring rules to determine a score for each of the location based attributes, as will be further described below. In one embodiment, for the group attributes, the computing device 103 may similarly use descriptions from the trained data 120 that are similar to the group attributes identified for the image.

In some embodiments, as will be further described below with reference to FIG. 9, a weight may be assigned to one or more segments, attributes, positional attributes, generic attributes, or group attributes. The weights may be based on the trained data 120, which include pre-defined weights or pre-defined proportions that define how much weight the feature attributes, positional attributes, generic attributes, or group attributes should be given when calculating an aggregate score for an image 130.

In an embodiment, the service provider 109 may generate the portrait image analysis module 125, which may consist of software instructions that are executable by the computing device 103 to perform portrait image analysis using the trained data 120. In this embodiment, the service provider 109 may package the trained data 120 and the portrait image analysis module 125 into a package and then transmit the packet across the network 106 via links 111 to the computing device 103. The computing device 103 may be configured to download the package and then install the portrait image analysis module 125 and the trained data 120 locally onto to the computing device 103 such that the computing device 103 is configured to implement the portrait image analysis mechanisms disclosed herein.

In an embodiment, the computing device 103 may already have the trained data 120 and portrait image analysis module 125 installed onto the computing device 103 upon manufacture of the computing device 103. The portrait image analysis module 125 and the trained data 120 may be installed as part of the operating system or the kernel of the computing device 103.

As disclosed herein, scoring various component parts of an image using pre-defined scores that are already based on a subjective analysis performed by professional photographers enables computing devices 103 to also perform a subjective analysis on the image without user involvement. The embodiments disclosed herein enable the computing device 103 to automatically discern whether an image is aesthetically valuable or not.

The aggregate score of an image may be used in many different types of use case scenarios and situations. For example, the computing devices 103 may be configured to delete images 130 that are below a threshold aggregate score to save memory and disc space of the computing device. In some cases, the aggregate score for each of the images 130 may assist the user in determining whether a photo or video should be saved or can be deleted, thereby also saving a memory and disc space of the computing device 103.

For a video (or a collection of images), a computing device 103 typically uses the first image of the video or a random image of the video as a portrait cover for the video. Similarly, a cover for an album is typically the first image 130 of the album or a random image 130 of the album. However, portrait covers for videos or albums may be automatically set based on the image of the video having the highest aggregate score. Therefore, the computing device 103 does not waste processing power on randomly identifying a portrait cover for the video or album.

In some cases, the computing device 103 may be configured to compute an aggregate score or determine an aesthetic value of an image while the image 130 is being captured by the computing device 103. For example, when the camera 119 is being used by the computing device 103, a display of the computing device may show the aggregate score of the image 130 that is intended to be captured by the camera 119. The user may easily determine an aesthetic value of the image 130, which may show people at various different angles and having various different emotions, based on the aggregate score shown on the display. This may prevent the user from unnecessarily capturing and storing images of a lower quality.

In situations where a user of a computing device 103 takes multiple consecutive images 130 of the same portrait setting in a short time frame (also referred to herein as continuous shooting or burst mode), an aggregate score may be computed for each of the images 130. The use of the aggregate score may help users easily identify which pictures are more aesthetically valuable such that the user may easily delete the images 130 that are not aesthetically valuable. Once the higher quality of images 130 are determined using the aggregate score, the user may not need to manually adjust the objective features of the images 130 or videos to create a higher quality image.

Computing devices 103 are configured to create customized videos or slideshows (sometimes referred to as "Wonderful Moments" images or videos) based on videos and images 130 stored at the computing devices. For example, these customized videos or slideshows are often smaller sized files that are easy to share on social media. In some cases, the computing devices 103 may use the aggregate scores of images 130 to create the customized videos or slideshows. For example, only the images 130 with higher aggregate scores may be included in the customized videos or slideshows.

In some embodiments, the computing devices 103 may also use the aggregate scores to determine images 130 that are aesthetically similar to one another. For example, computing devices 103 may organize images 130 based on aesthetic similarities and may create folders for images 130 having similar aesthetic qualities or aggregate scores. As should be appreciated, the aggregate score for images 130 may otherwise be used for many different applications, such as, for example, video summarization, ranking images in an album, ranking frames in a video, etc.

Figure 2:
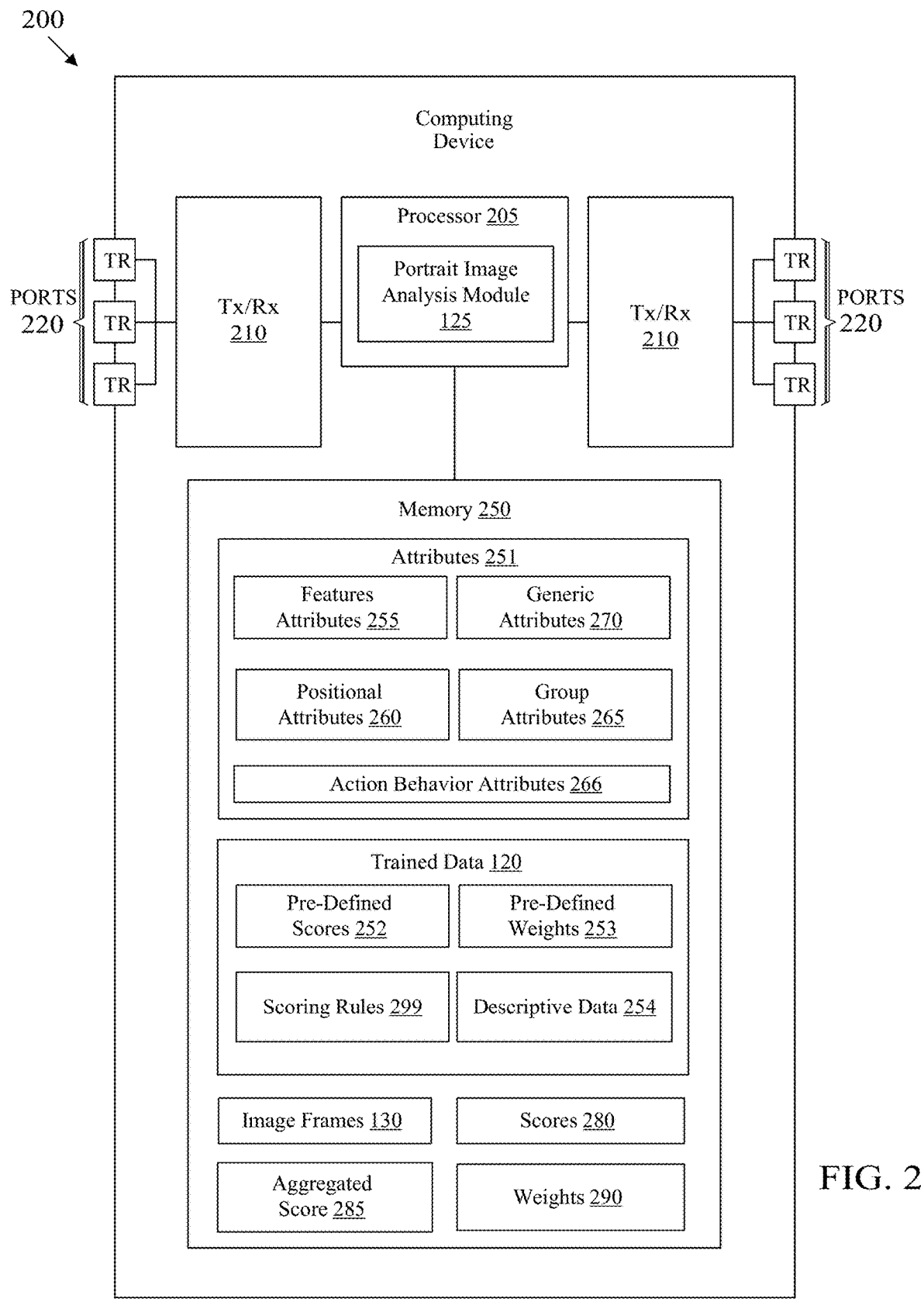
FIG. 2 is a schematic diagram of an embodiment of a computing device.

FIG. 2 is a schematic diagram of an embodiment of a computing device 103. The computing device 103 may be configured to implement and/or support the portrait image analysis mechanisms and schemes described herein. The computing device 103 may be implemented in a single node or the functionality of computing device 103 may be implemented in a plurality of nodes. One skilled in the art will recognize that the term computing device encompasses a broad range of devices of which computing device 103 is merely an example. For example, a computing device can be a general purpose computer, a mobile device, a tablet device, a wearable device, or any other type of user equipment. The computing device 103 is included for purposes of clarity of discussion, but is in no way meant to limit the application of the present disclosure to a particular computing device embodiment or class of computing device embodiments.

At least some of the features/methods described in the disclosure are implemented in a computing apparatus or component such as a computing device 103. For instance, the features/methods in the disclosure may be implemented using hardware, firmware, and/or software installed to execute on hardware. As shown in FIG. 2, the computing device 103 comprises transceivers (Tx/Rx) 210, which may be transmitters, receivers, or combinations thereof. The Tx/Rx 210 is coupled to a plurality of ports 220 for transmitting and/or receiving packets from other nodes.

A processor 205 is coupled to each Tx/Rx 210. The processor 205 may comprise one or more multi-core processors and/or memory devices 250, which may function as data stores, buffers, etc. The processor 205 may be implemented as a general processor or by one or field programmable gate arrays (FGPAs), application specific integrated circuits (ASICs), and/or digital signal processors (DSPs).

In one embodiment, the processor 205 comprises internal logic circuits to implement the portrait image analysis module 125, and may comprise internal logic circuits to implement the functional steps in methods 300 and 1000, as discussed more fully below, and/or any other flowcharts, schemes, and methods discussed herein. As such, the inclusion of the portrait image analysis module 125 and associated methods and systems provide improvements to the functionality of the computing device 103. In an alternative embodiment, the portrait image analysis module 125 may be implemented as instructions stored in the memory device 250, which may be executed by the processor 205 to perform the operations of the portrait image analysis module 125. Furthermore, the portrait image analysis module 125 can optionally be omitted from the computing device 103.

The memory device 250 may comprise a cache for temporarily storing content, e.g., a random-access memory (RAM). Additionally, the memory device 250 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof.

The memory device 250 may be configured to store attributes 251, images 130, trained data 120, scores 280, the aggregate scores 285, and weights 290. The images 130 may include a plurality of images that are stored at the memory device 250 of the computing device 103. At least some of the images 130 may be captured by a camera 119 at the computing device 103 of FIG. 1 and subsequently stored at the memory device 250 of the computing device 103. The images 130 may also be received from another source and stored at the memory device 250 of the computing device 103. The images 130 relevant to the present disclosure are portrait images that depict one or more people as the most significant portion of the image, as opposed to the landscape or scenery around or behind the person.

The trained data 120 includes a pre-defined score 252 for each attribute 251 identified in a segment. The trained data 120 may also include a descriptive data 254 that describes the attribute 251 for that pre-defined score 252. The trained data 120 may also include a pre-defined weight 253 for certain regions of interest or attributes 251, which will be further described below with reference to FIGS. 7A-B. The trained data 120 may also include the scoring rules 299, which may be values that are computed and considered during the determination of a score 280 for a region of interest of an image 130 being analyzed. Attributes 251 include feature attributes 255, positional attributes 260, group attributes 265, action behavior attributes 266, and generic attributes 270.

As described above with reference to FIG. 1, the feature attributes 255 may be characteristics of the person depicted in the image 130 that are determined from a segment of the image (such as, for example, an emotion or expression of the face of the person). The positional attributes 260 may be characteristics that describe a location of the person and certain regions of interest of the person relative to image 130 as a whole (such as, for example, an angle of the face or a scale of the body within the image). The generic attributes 270 may be characteristics that describe the person on a general level without reference to specific a region of interest of the person (such as, for example, a gender or race of the person). The group attributes 265 may be characteristics that describe the relationship between the multiple people in the image 130 and the arrangement of the multiple people within the image 130 (such as, for example, a family photo or a group photo). The action behavior attributes 266 may be gestures or movements performed by the people in the image 130 (such as, for example, a pose or hand gesture).

As described above with reference to FIG. 1, the scores 280 may be scores that are assigned to attributes 251, such as positional attributes 260, generic attributes 270, group attributes 265, and/or action behavior attributes 266 of an image 130 based on the pre-defined scores 252 and the scoring rules 299. The aggregate scores 285 may be scores 280 that are aggregate for each image 130 that are associated with (or describe) an aesthetic value of an image 130. The weights 290 may be proportional weights that are assigned to each of the scores 280 based on the pre-defined weights and pre-defined weighting rules when aggregating the scores 280 for an image 130 to create the aggregate score 285.

It is understood that by programming and/or loading executable instructions onto the computing device 103, at least one of the processor 205 and/or memory device 250 are changed, transforming the computing device 103 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 3:
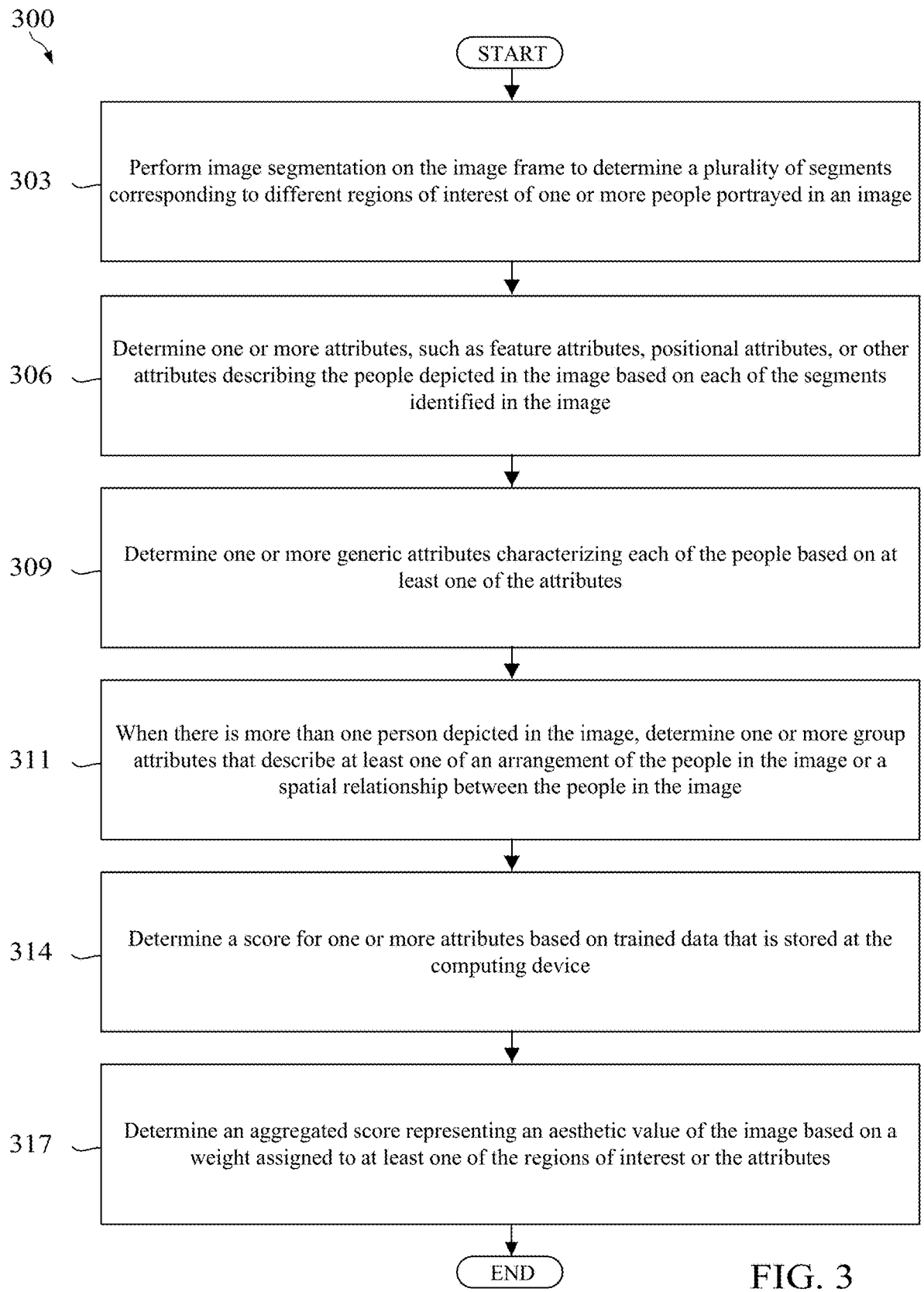
FIG. 3 is a flowchart of a method for performing portrait image analysis according to the embodiments disclosed herein.

FIG. 3 is a flowchart of a method 300 for performing portrait image analysis according to the embodiments disclosed herein. Method 300 may be performed by the computing device 103 after the portrait image analysis module 125 has been installed on the computing device 103. Method 300 may be performed by the computing device 103 after an image 130 is obtained. The image 130 may be obtained using the camera 119 after the camera 119 captures the image 130. The image 130 may be obtained by retrieving the image 130 from memory device 250. The image 130 may be obtained by receiving the image 130 from another source device.

At step 303, image segmentation may be performed on the image 130 to determine a plurality of segments corresponding to different regions of interest of one or more people portrayed in the image 130. The processor 205 may execute the portrait image analysis module 125 to determine the segments of the image 130. Segmentation may be performed according to any method of object detection in an image 130, such as R-CNN or faster R-CNN. For example, in faster R-CNN, segmentation involves regression, which is the process of fine tuning the segment enclosing the region of interest so that the segment accurately and completely encloses the region of interest of an image 130. In an embodiment, segmentation may be performed according to a faster implementation, as will be further described below in FIGS. 8A-B. Each of these segments may be rectangular boxes that enclose the particular region of interest, or body part, of the person portrayed in the image. An image 130 may be segmented into segments for the upper body, face, mouth, and eyes of a person depicted in the image 130.

At step 306, attributes 251 may be determined for one or more segments of the image 130. The processor 205 may execute the portrait image analysis module 125 to determine the attributes 251 of the image 130. In some cases, the portrait image analysis module 125 may be performed by the service provider 109 as well when the service provider is performing portrait image analysis. The feature attributes 255, positional attributes 260, generic attributes 270, group attributes 265, and action behavior attributes 266 may be determined according to any method of object classification in an image 130, such as R-CNN or faster R-CNN. In faster R-CNN, determining the attributes 251 in an image 130 may be referred to as classification of the segments identified in an image 130. Classification of the segment involves labeling the segment as a certain region of interest or labeling the segment as having the attribute 251.

The image 130 that has been segmented into segments for the upper body, face, mouth, and eyes may be analyzed to determine attributes 251. The segment for the upper body may be used to identify positional attributes 260, such as an angle of the body. The segment for the eyes may be used to identify feature attributes 255, such as whether the eyes are open or closed, and the segment for the mouth may be used identify more feature attributes 255, such as whether the person portrayed in the picture is smiling or not.

At step 309, generic attributes 270 may be determined for one or more segments of the image 130. The processor 205 may execute the portrait image analysis module 125 to determine the generic attributes 270 of the image 130. The generic attributes 270 may be also be determined according to any method of object classification in an image 130, such as R-CNN or faster R-CNN.

The image 130 that has been segmented into segments for the upper body, face, mouth, and eyes may be analyzed to determine generic attributes 270. The segment for the face may be used to determine a skin color of the person portrayed in the image 130, which can be then used to identify a race of the person.

Figure 5A:
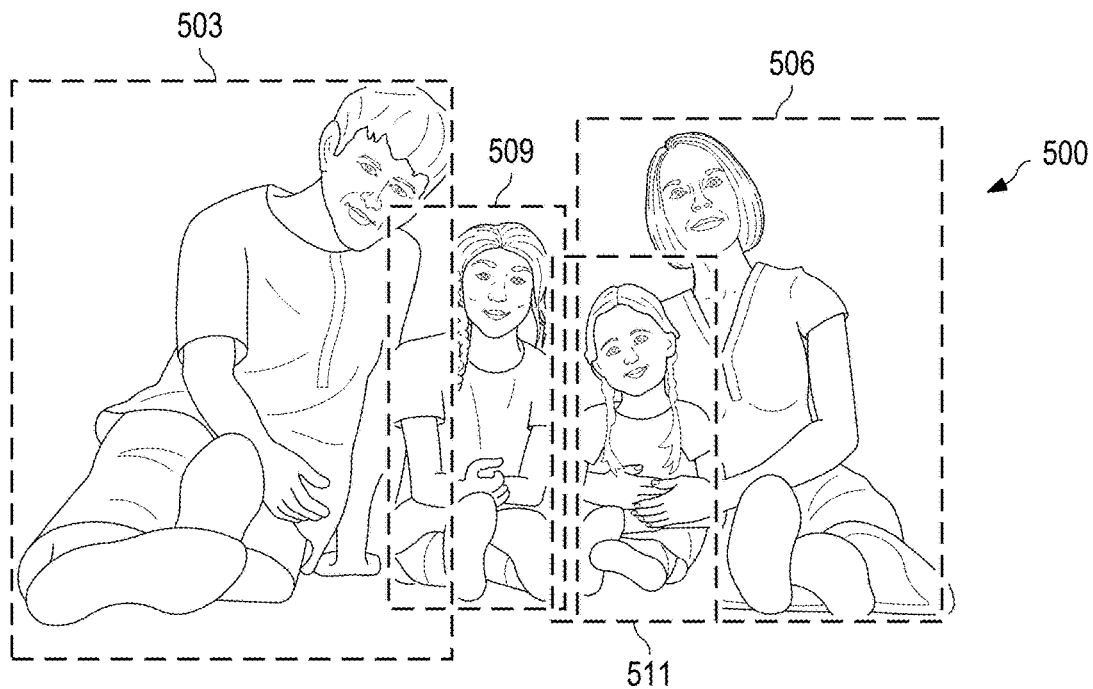
FIGS. 5A-C are drawings of multi-person images that have been segmented based on the people portrayed in the image.

At step 311, group attributes 265 may be determined for one or more people depicted in the image 130 based on the various segments associated with each of the people in the image 130. The processor 205 may execute the portrait image analysis module 125 to determine the group attributes 265 of the image 130. The group attributes 265 may be determined according to any method of group classification in an image 130, such as R-CNN or faster R-CNN. An example of identifying group attributes 265 in an image 130 is shown in FIG. 5A.

Group attributes 265 may also be determined for one or more segments of the image 130 when there is more than one person depicted in the image. For example, suppose there are two people portrayed in the image, and a segment for the body of each person is identified. In this case, the positions of these segments can be used to determine a group attribute 265, such as the spatial relationship between the two people. An example of identifying group attributes 265 in an image 130 is shown in FIG. 5A.

At step 314, a score 280 is determined for at least one of the attributes 251 (e.g., feature attributes 255, positional attributes 260, generic attributes 270, group attributes 265, and action behavior attributes 266) based on the trained data 120 that is stored in the memory device 250 of the computing device 103. The processor 205 may execute the portrait image analysis module 125 to determine the scores 280 for at least one of attributes 251 identified in the image 130.

In one embodiment, the portrait image analysis module 125 may obtain an attribute 251 identified in the image 130 and then compare the attribute 251 to the descriptive data 254 to determine whether a pre-defined score 252 exists for the attribute 251 or whether a pre-defined score 252 exists for a similar attribute 251. In one embodiment, when the attribute 251 matches the descriptive data 254 for a pre-defined score 252, the portrait image analysis module 125 may determine that the pre-defined score 252 associated with the descriptive data 254 should be the score 280 for the particular attribute 251 being scored.

For example, suppose the trained data 120 includes a pre-defined score 252 of 0 for descriptive data 254 describing a segment showing closed eyes and a pre-defined score 252 of 1 for descriptive data 254 describing a segment showing open eyes. In this case, the segment for the eyes extracted from the image 130, or the feature attribute 255 identifying that the segment for the eyes as being open or closed, may be compared to the descriptive data 254 in the trained data 120 to determine a score 280 for the segment for the eyes of the image 130. When the pre-defined score 252 for eyes that are open is 1, then the score 280 for an image 130 depicting open eyes is also 1. Similarly, if the pre-defined score 252 for eyes that are closed is 0, then the score 280 for an image 130 depicting open eyes is also 1.

In some cases, an attribute 251 identified based on a region of interest may not exactly match a value in the descriptive data 254 for a predefined score 252. That is, a region of interest may have so many different attributes 251 that not all of them may be scored or rated in the pre-defined scores 252. These types of regions of interest that have many variations of attributes 251 may have a discrete number of attributes 251 or a continuous number of attributes 251 that describe the region of interest.

A region of interest of an image 130 may have a discrete number of attributes 251 when a segment corresponding to the region of interest may have a number of different attributes 251 that describes a feature of the region of interest. For example, attributes 251 identified by the mouth segment may include many different feature attributes 255, such as a neutral mouth expression, a smile, a laugh, a yawn, a mouth that is in the middle of talking, etc. In this way, the mouth (e.g., region of interest) of a person displayed in an image 130 may have a discrete number of attributes 251 that describes the expression of the mouth. In an embodiment, pre-defined scores 252 may be stored for each of discrete attributes 251 that describe the region of interest, in which a higher pre-defined score 252 signals a higher aesthetic value for that region of interest. However, in some cases, an image 130 being analyzed may define an attribute 251 for that region of interest which may not have an exact corresponding pre-defined score 252.

Similarly, a region of interest identified in a segment of the image may have a continuous number of attributes 251 when a segment corresponding to the region of interest may show a continuous (or large) number of variations. For example, a positional attribute 260 for a location of the body segment within the image 130 may have a large number of variations because the body segment may be located anywhere on the image. There may not be a pre-defined score 252 for each of these different variations as to where the body segment may be locate. When a body segment associated with a body of the person shown in the image 130 is positioned in the far left or far right of the image 130, the image 130 may have poor aesthetic value. In an embodiment, pre-defined scores 252 may be stored for one or more of the continuous number of attributes 251 that describe this region of interest, in which a higher pre-defined score 252 signals a higher aesthetic value for that region of interest. However, in some cases, an image 130 being analyzed may define an attribute 251 for that region of interest which may not have an exact corresponding pre-defined score 252.

In both of these cases in which a region of interest may be described by a discrete number of attributes 251 or a continuous number of attributes 251, the portrait image analysis module 125 may determine a score 280 for the attribute 251 based on multiple different pre-defined scores 252 for descriptive data 254 describing similar feature attributes 255 and scoring rules 299. The portrait image analysis module 125 may identify pre-defined scores 252 that are associated with similar attributes 251 as the attribute 251 being scored based on the descriptive data 254. The multiple pre-defined scores 252 may be normalized and processed using a scoring rule 299 and a regression machine learning (ML) model, to determine a score 280 for an attribute 251 of the image 130. The regression ML model, may be a linear regression algorithm that is used to define a score 280 based on multiple different pre-defined scores 252.

As described above, a scoring rule 299 is a value that is computed and considered during the determination of a score 280 for a region of interest or attribute 251 of an image 130 being analyzed. In some embodiments, each attribute 251 or region of interest may have corresponding scoring rules 299 are used in the determination of a score 280 for that attribute 251. As an example, for the positional attribute 260 describing the body location of a body segment of a person displayed in the image 130, a scoring rule 299 may include a body horizontal location scoring rule 299 and a body vertical location scoring rule 299. The body horizontal location scoring rule 299 may be a horizontal distance between a center of the body segment and a center of the image 130. The horizontal distance may be normalized against the width of the image 130 to determine a score 280 for the positional attribute 260 describing the body location of the body segment. The body vertical location scoring rule 299 may be a vertical distance between a center of the body segment and a center of the image 130. The vertical distance may be normalized against the width of the image 130 to determine a score 280 for the positional attribute 260 describing the body location of a body segment.

As another example, for the positional attribute 260 describing the body scale of a body segment of a person displayed in the image 130, a scoring rule 299 may include a body scale scoring rule 299. The body scale scoring rule 299 may be a ratio as follows: (height of the body segment) (width of the body segment)/(height of the image 130)(width of the image 130). The body scale scoring rule 299 is a ratio between a size of the body segment and a size of the image 130.

As another example, for the positional attribute 260 describing the body ratio of a segment of a person displayed in the image 130, a scoring rule 299 may include a body ratio scoring rule 299. The body ratio scoring rule 299 may be a ratio as follows: (height of the body segment)/(width of the body segment). The body ratio scoring rule 299 may be used to determine whether the image 130 is a half body portrait or a full body portrait. The body ratio scoring rule 299 may also be used to determine whether the person shown in the image is sitting down or standing up.

In some embodiments, the scoring rules 299 may be converted into a single dimension continuous value scale comprising all the different variations of scoring rules 299. These scoring rules 299 may be aggregate into an overall score for this sub-dimension by a weighted aggregation process obtained by a regression model trained process. The goal for regression model trained is to determine the weights 290 and the aggregation equations that form the weighted aggregate score 285. In some cases, the trained data 120 produces a trained ML model that determines the aesthetic value of images 130 as close as possible to the trained data 120 produced from the prototype images 123.

Suppose that when scoring a positional attribute 260, such as a scale of a body within an image 130, the portrait image analysis module 125 may not be able to identify a specific pre-defined score 252 that matches the positional attribute 260 of a currently analyzed image 130. The portrait image analysis module 125 may not be able to identify a pre-defined binary score 252 for a particular attribute 251 when that attribute is continuous (e.g., there are too many different variations of the attribute 251 such that it would be difficult to identify an exact match between an attribute 251 in a currently analyzed image 130 and the descriptive data 254 for a pre-defined score 252). In this case, the portrait image analysis module 125 may identify multiple pre-defined scores 252 with similar body scales as the body scale identified in the currently analyzed image 130. These pre-defined scores 252 and the pre-defined scoring rule 299 may be input into the regression ML model to output a score 280 for the positional attribute 260.

In some embodiments, the scores 280 determined for each attribute 251 or feature of the image 130 may be further fine-tuned using an absolute error loss function. The absolute error loss function may be used to minimize errors in the scores 280 determined for each attribute 251 or other feature of the image 130.

At step 317, an aggregate score 285 representing an aesthetic value of the image 130 may be determined based on weights 290 assigned each of the attributes 251 or features of the image 130 that have been scored. The weights 290 may be determined based on the pre-defined weights 253 in a manner similar to how the scores 280 are determined based on the pre-defined scores 252, as described above. A weight 290 corresponds to a proportion or percentage of weight that the score 280 should be given in an aggregate score 285. These proportions may be stored in the pre-defined weights 253 and used to determine the weight 290 for a score 280 of an image 130 with multiple different pre-defined scores 252 for multiple different attributes 251 and features of an image 130.

The processor 205 may execute the portrait image analysis module 125 to determine the aggregate score 285 based on the scores 280 and/or the weights 290. Each of the scores 280 determined for an image 130 may be weighted according to a corresponding weight 290, if applicable, and then summed together to generate the aggregate score 285 for an image 130.

Figure 4:
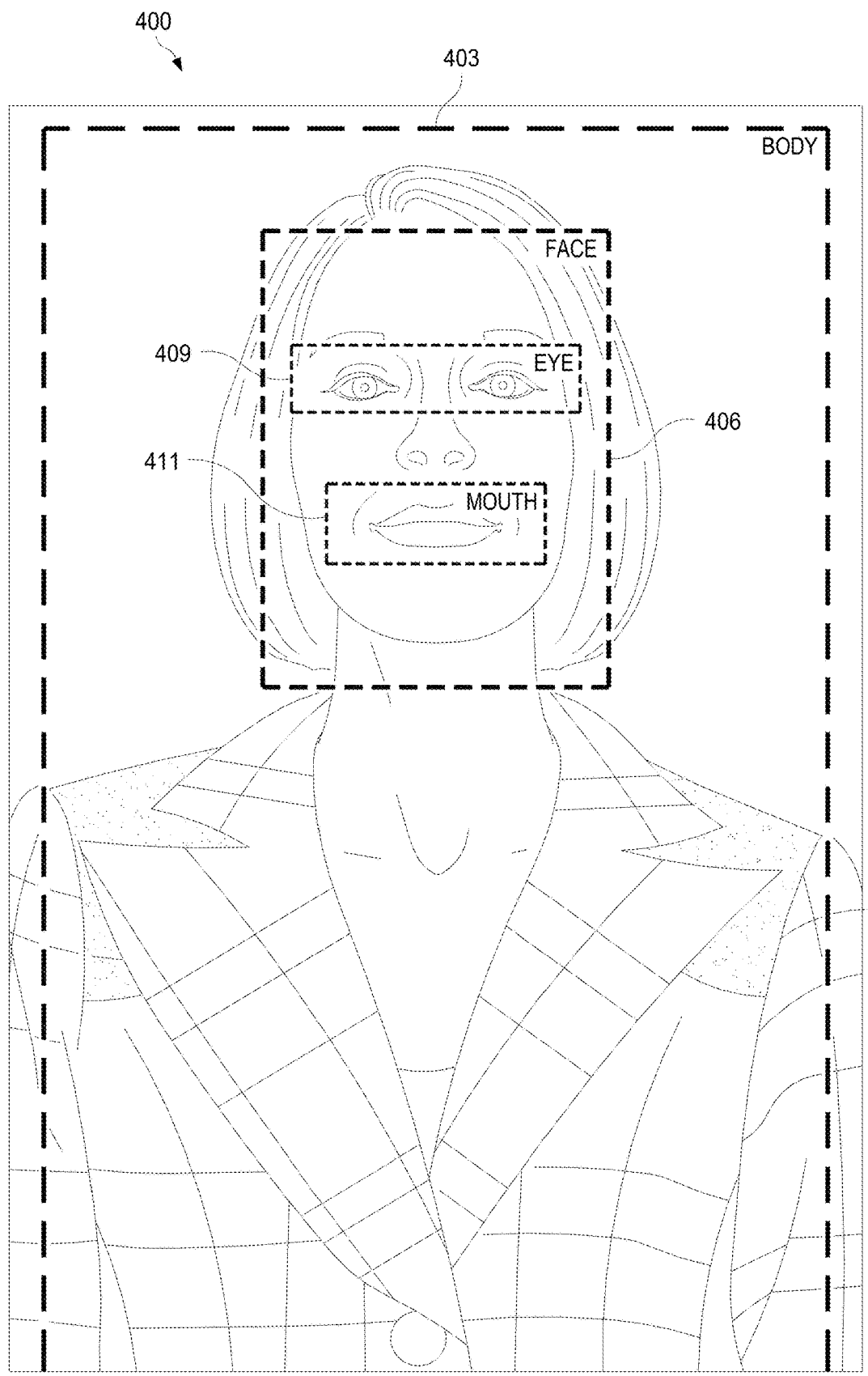
FIG. 4 is a drawing of a single person portrait image that has been segmented based on regions of interest of the person in the image.

FIG. 4 is a drawing of a single person portrait image 400 that has been segmented based on regions of interest of the person in the image. The single person portrait image 400 has been segmented into four segments, a body segment 403, a face segment 406, an eyes segment 409, and a mouth segment 411. The face segment 406 may be a sub-segment of the body segment 403 such that there is a dependency relationship between the face segment 406 and the body segment 403. Similarly, the eyes segment 409 and the mouth segment 411 may be sub-segments of the face segment 406 such that there is a dependency relationship between the eyes segment 409 and the face segment 406 and a dependency relationship between the mouth segment 411 and the face segment 406. The dependency relationship refers to a relationship between segments and sub-segments, where sub-segments are likely to be positioned within a segment. As will be further described below with reference to FIGS. 5A-C, the dependency relationship may be used to perform more efficient segmenting of images 130 and 400.

In some embodiments, each of the segments 403, 406, 409, and 411 may be analyzed to determine attributes 251 of the person portrayed in the single person portrait image 400. The body segment 403 may be analyzed to determine attributes 251, such as feature attributes 255 and positional attributes 260 of the body parts portrayed in the body segment 403. Feature attributes 255, such as a size of the body or a posture of the body, and positional attributes 260, such as an angle of the body, may be determined using the body segment 403. As should be appreciated, other types of attributes 251 or other features of the image 400 may be determined using the body segment 403.

The face segment 406 may be analyzed to determine generic attributes 270, such as race, gender, and age range of the person portrayed in the image 400. The eyes segment 409 may be analyzed to determine feature attributes 255, such as whether the eyes are open or closed. The mouth segment 411 may be analyzed to determine feature attributes 255, such as whether the mouth is smiling, laughing, or frowning.

FIG. 5A is a drawing of a multi-person portrait image 500 that has been segmented based on the different people depicted in the image 500. The multi-person portrait image 500 includes four segments for each person depicted in the image 500: a first person segment 503, a second person segment 506, a third person segment 509, and a fourth person segment 511. The first person segment 503, second person segment 506, third person segment 509, and fourth person segment 511 are rectangular boxes that respectively enclose the four different people portrayed in the image 500.

In some embodiments, each of the person segments 504, 506, 509, and 511 are segmented individually similar to how the single portrait image 400 is segmented, and then analyzed to determine attributes 251, such as feature attributes 255, positional attributes 260, generic attributes 270, and action behavior attributes 266. The generic attributes for each of the person segments 504, 506, 509, and 511 may indicate an age range and a gender for each person shown in the image 500.

In some embodiments, all of the person segments 504, 506, 509, and 511 may be analyzed to determine group attributes 265 that define the spatial relationship and arrangement of people within the image 500. An analysis of the person segments 504, 506, 509, and 511 may determine a group attribute 265, such as an indication that each person depicted in each of the person segments 504, 506, 509, and 511 are arranged in a line sitting on the floor in an embracing manner. Another group attribute 265 that may be identified in the image 500 is that each of the of the person segments 504, 506, 509, and 511 slightly overlap each other, signifying that the people depicted in the image 500 are positioned closely together.

In some embodiments, these group attributes 265 can be combined with the generic attributes 270 to identify important characteristics of the multi-person portrait image 500 that may help generate an aggregate score 285 of the multi-person portrait image 500. For example, family portraits and family photos are considered highly valuable from an aesthetic perspective for most users. Using the generic attributes 270 and the group attributes 265, the computing device 103 may easily determine whether the multi-person portrait image 500 is a family photo. When the generic attributes 270 for two of the person segments 503 and 506 indicate two different genders (male and female) of a much higher age range than the generic attributes 270 of the other person segments 509 and 511, the computing device 103 may determine that the person segments 504, 506, 509, and 511 correspond to members of a family. In this way, the group attributes 265 such as the close spatial relationship and the in-line arrangement of the family may indicate that the multi-person portrait image 500 is a family portrait in which each of the members of the family are posing.

In some embodiments, these types of multi-person portrait images 500 may include higher weights 290 for the group attributes 265 and the generic attributes 270 that help define this multi-person portrait image 500 as a family photo. Other feature attributes 255 that show whether the individual is smiling may also be assigned a higher weight 290 since sometimes small children do not smile for posed photos. Objective features may also be included in the aggregate score 285 for the multi-person portrait image 500. The quality of the image background may be considered an attribute of the image, and may be scored and weighted as such. For example, a background of the multi-person portrait image 500 may be analyzed to determine whether there is a single color and a sharp contrast between the background and the person segments 504, 506, 509, and 511. Other objective features such as bright colors, color balance, and background blur may also be considered as a quality of the background of the image.

Figure 5B:
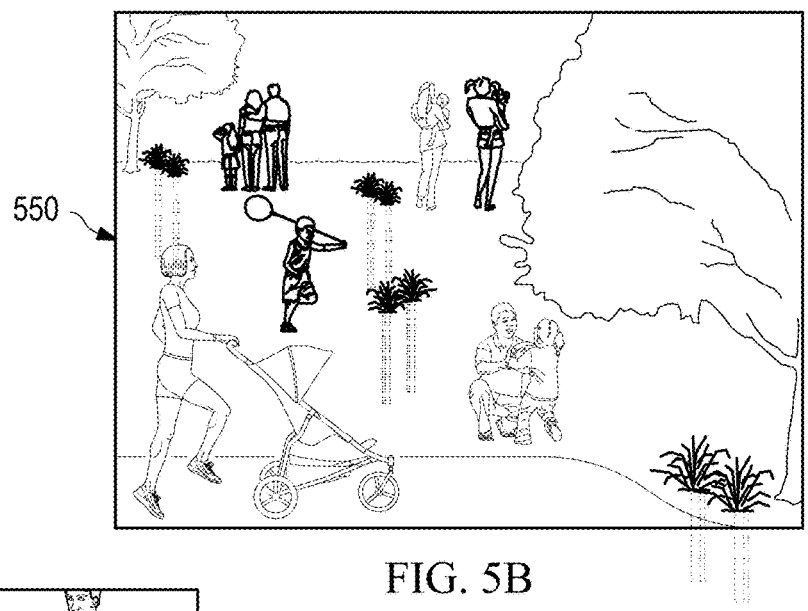
Figure 5C:
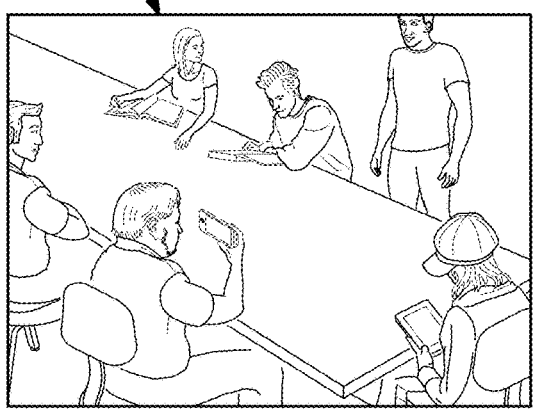

FIGS. 5B-C show other examples of multi-person images 550 and 560. The multi-person image 550 shows randomly positioned person segments within a landscape. Group attributes 265 may be defined for the multi-person image 550 which indicate that the spatial relationship and arrangement of the person segments shown in multi-person image 550 as one that is sporadic and unorganized. Such a group attribute 265 may be assigned a low pre-defined score 252 and thus, a low score 280 for currently analyzed image 130.

The multi-person image 560 shows a group setting where the person segments are arranged in several different layers. In this multi-person image 560, the group attributes 265 may reflect that the person segments are positioned close together but in layers at various depths of the multi-person image 560. Such a group attribute 265 may be assigned a certain pre-defined score 252 based on whether professional photographers consider layered images as adding to the aesthetic value of an image 130 or decreasing from the aesthetic value of an image 130.

Figure 6:
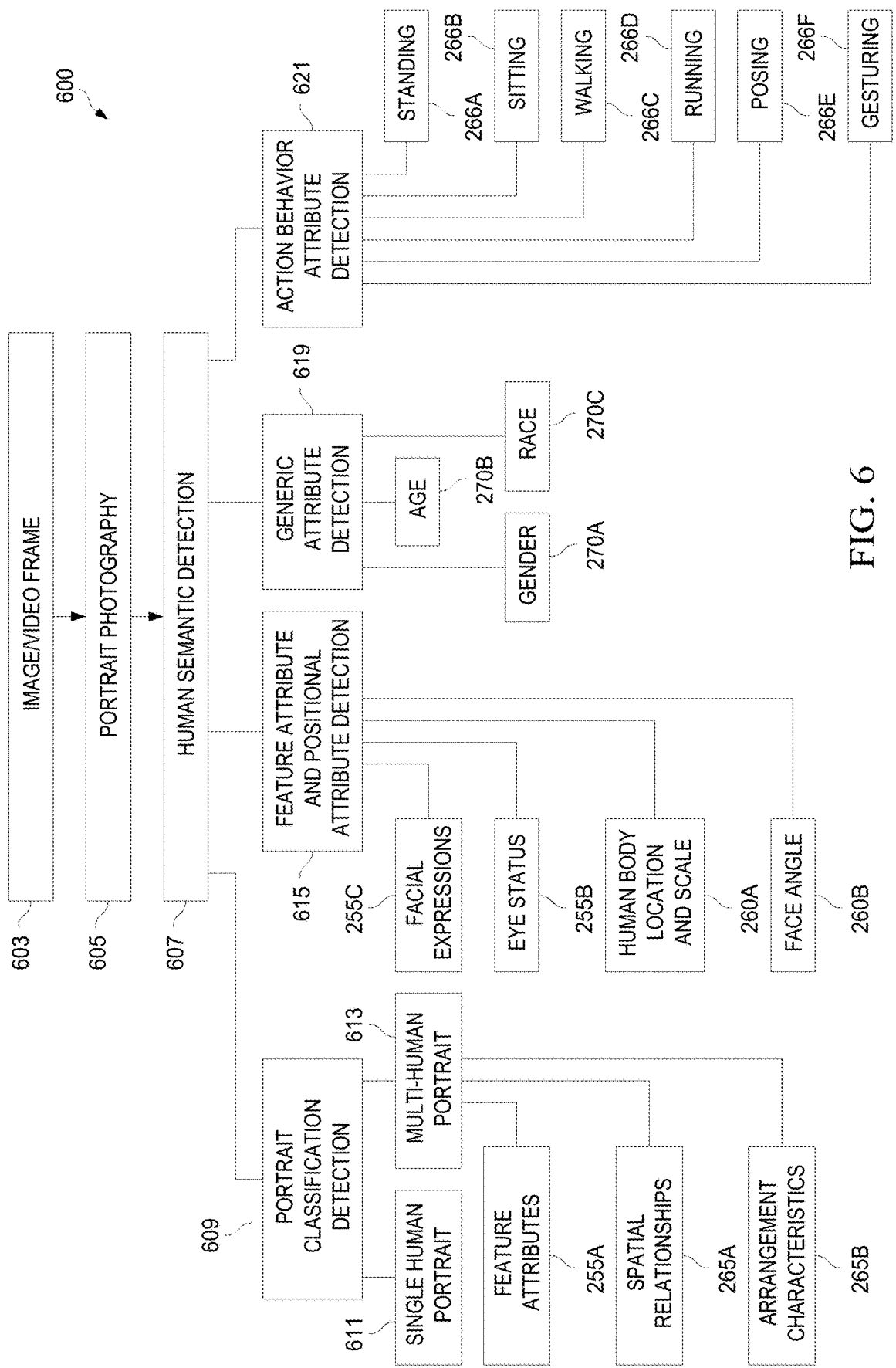
FIG. 6 is a flowchart of a method of determining attributes for an image being analyzed.

FIG. 6 is a flowchart of a method 600 of determining attributes 251 for an image 130 being analyzed. Method 600 may be performed by the computing device 103 after the portrait image analysis module 125 has been installed on the computing device 103. Method 600 may be performed by the computing device 103 after an image 130 is obtained. Method 600 may also be performed by the service provider 109 after the image 130 is obtained.

At step 603, an image 130 is obtained by capturing the image 130 from the camera 119, or by retrieving the image 130 from a memory device 250. In some embodiments, the image 130 may be one of a collection of images 130 included in a video. For videos, each image 130 may be analyzed and scored separately and then aggregate together to create an aggregate score 285 that sums each of the aggregate scores 285 for each image 130 of the video.

At step 605, a determination is made as to whether the image 130 is a portrait image. Certain portions, or pixels, of the image 130 may be examined to determine if the majority of the image 130 shows one or more people. When a certain number of pixels of the image 130 that displays person features exceeds a threshold number, than the image 130 may be determined to be a portrait image. In some embodiments, the processor 205 may execute the portrait image analysis module 125 to determine whether the image 130 is a portrait image.

At step 607, person semantics detection may be performed on the image 130. The person semantics detection may involve determining the attributes 251, such as feature attributes 255, positional attributes 260, group attributes 265, generic attributes 270, action behavior attributes 266, and other features of the image 130. The processor 205 may execute the portrait image analysis module 125 to perform person semantics detection on the image.

As shown in FIG. 6, person semantics detection involves several layers or levels of detection of person related objects within an image 130. At step 609, portrait classification detection may be performed on the image 130. Portrait classification detection may involve determining whether the image 130 can be classified as a portrait image 611 (e.g., image 400) or a multi-person image 613 (e.g., image 500). A portrait image shows a single person, while a multi-person image shows multiple people. The processor 205 may execute the portrait image analysis module 125 to determine whether the image 130 shows a single person or multiple people.

In some embodiments, when the image 130 shows multiple people, the image 130 may be segmented to create segments for each person, and each person may be further segmented by regions of interest, or body parts person. Each of these segments for each person in the image 130 may be analyzed to determine a feature attribute 255A. Each of these segments for each person depicted in the image 130 may also be analyzed to determine group attributes 265, such as spatial relationships 265A and arrangement characteristics 265B. Spatial relationships 265A refer to an analysis of how much space is in between each person depicted in the image 130. Arrangement characteristics 265B refer to an analysis of how the people are arranged in the image 130. As should be appreciated, the spatial relationships 265A and the arrangement characteristics 265B are merely two examples of group attributes 265, and there many any number or type of group attributes 265 determined in an image 130.

At step 615, the feature attributes 255 and positional attributes 260 of the image 130 may be detected. The processor 205 may execute the portrait image analysis module 125 to determine feature attributes 255 and positional attributes 260 of the image 130. Examples of positional attributes 260 that may be determined include the person body location and scale 260A and a face angle 260B. The person body location and scale 260A may be determined using, for example, the body segment 403, and the face angle 260B may be determined using, for example, the face segment 406. Examples of feature attributes 255 that may be determined include the facial expression 255C and the eye status 255B. The facial expression 255C may be determined using, for example, the mouth segment 411, and the eye status 255B may be determined using, for example, the eyes segment 409. As should be appreciated, the person body location and scale 260A and the face angle 260B are merely two examples of positional attributes 260, and there may be any number or type of positional attributes 260 determined in an image 130. Similarly, the facial expression 255C and the eye status 255B are merely two examples of feature attributes 255, and there may be any number or type of feature attributes 255 determined in an image 130.

At step 619, the generic attributes 270 of the people depicted in the image 130 may be detected. The processor 205 may execute the portrait image analysis module 125 to determine generic attributes 270 of the image 130 based on or more segments for each of the people. Examples of generic attributes 270 that may be determined include gender 270A, age range 270B, and race 270C. As should be appreciated, the gender 270A, age range 270B, and race 270C are merely three examples of generic attributes 270, and there may be any number or type of generic attributes 270 determined for an image 130.

At step 621, the action behavior attributes 266 of the people depicted in the image 130 may be detected. The action behavior attributes 266 may be used for images 130 that collectively form a video. The processor 205 may execute the portrait image analysis module 125 to determine action behavior attributes 266 of the image 130 based on or more segments for each person. Examples of action behavior attributes 266 that may be determined include a determination of whether the person is standing 266A, sitting 266B, walking 266C, running 266D, posing 266E, or gesturing 266F. These action behavior attributes 266 may be determined using, for example, the body segment 403. As should be appreciated, there many any number or type of action behavior attributes 266 determined in an image 130.

In some embodiments, once the feature attributes 255, positional attributes 260, group attributes 265, and generic attributes 270 are determined using the segments identified in an image 130, at least one of these feature attributes 255, positional attributes 260, group attributes 265, and generic attributes 270 may be scored. As described above, the pre-defined scores 252 in the trained data 120 may be used to determine scores 280 for each of these feature attributes 255, positional attributes 260, group attributes 265, and generic attributes 270. In some embodiments, each of the scores 280 may be summed together to equal the aggregate score 285. In some embodiments, some of these scores may be weighted according to weights 290 when determining an aggregate score 285 for the image 130.

Figure 7A:
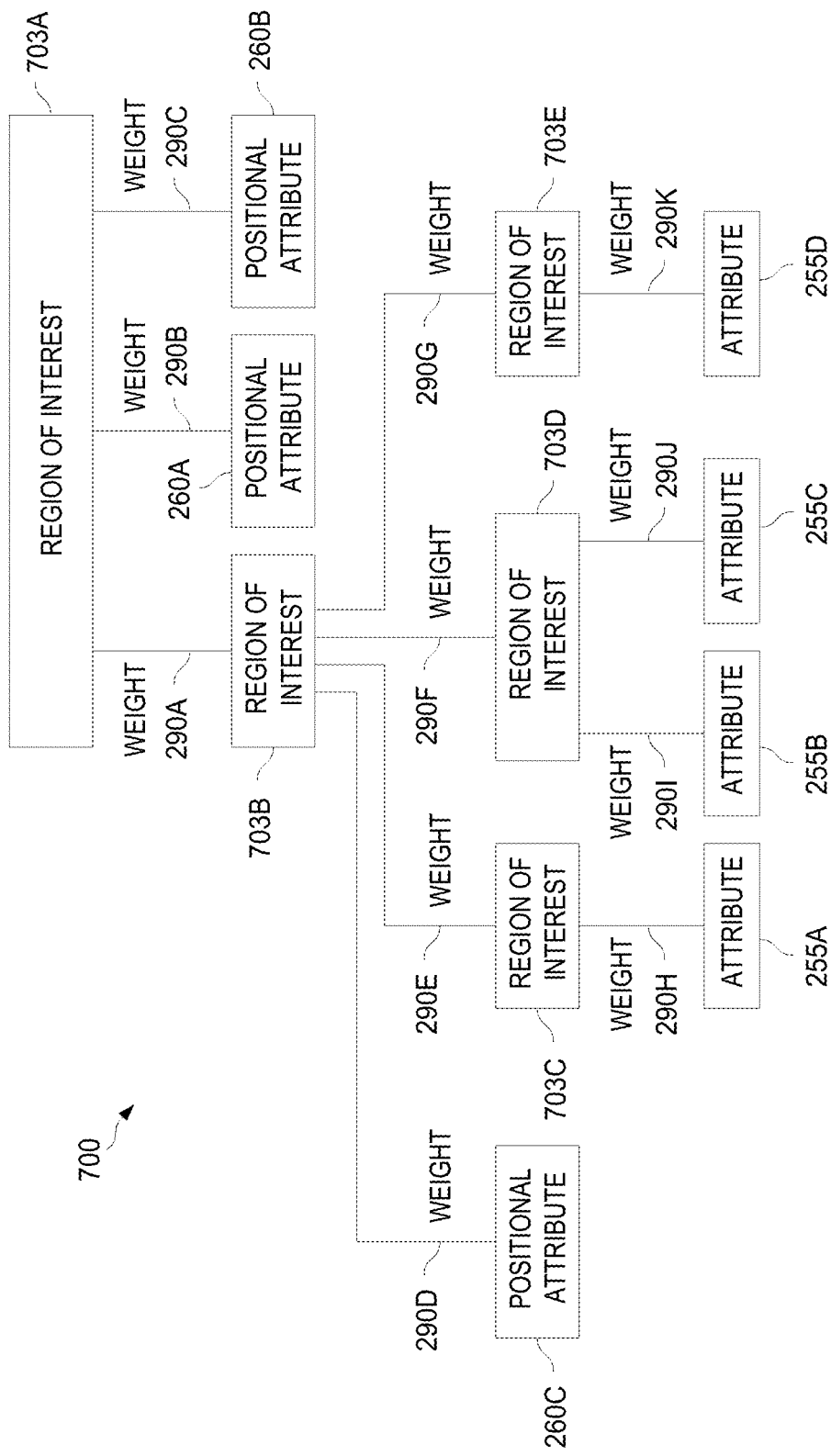
FIG. 7A is a diagram illustrating a scoring tree that may be used to compute an aggregate score for an image.

FIG. 7A is a diagram illustrating a scoring tree 700 that may be used to compute an aggregate score 285 for an image 130. The scoring tree 700 includes multiple regions of interest 703A-E of a person portrayed in the image 130. The scoring tree 700 also includes several positional attributes 260A-C and feature attributes 255A-D as leaf nodes of one or more regions of interest 703A-E. While scoring tree 700 only shows leaf nodes for positional attributes 260 and feature attributes 255, it should be appreciated that a score tree 700 for other images 130 may include other attributes 251 such as group attributes 265, generic attributes 270, and action behavior attributes 266.

A scoring tree 700 may include nodes for at least one of the regions of interest 703A-E, feature attributes 255, positional attributes 260, group attributes 265, or generic attributes 270, each of which are arranged in the scoring tree 700 based on a dependency between the nodes. A dependency may refer to a relationship between two regions of interest or a relationship between a region of interest 703A-E and an attribute 251. A dependency exists between two regions of interest 703A-E when one region of interest 703A-E is located within another region of interest 703A-E in the image 130. A dependency may exist between a region of interest 703A-E and an attribute 251 when the attribute 251 describes the particular region of interest 703A-E.

In some embodiments, each node representing a region of interest 703A-E may include several leaf nodes for other regions of interest 703A-E or attributes 251, such as feature attributes 255, positional attributes 260, group attributes 265, generic attributes 270, action behavior attributes 266, objective features of the image 130, or other features of the image 130. However, the nodes representing attributes 251, such as feature attributes 255, positional attributes 260, group attributes 265, or generic attributes 270, may not include any leaf nodes.

As shown in FIG. 7, a score tree 700 typically has a parent node representing a parent attribute, such as a region of interest 703A. The region of interests 703A-E correspond to various parent attributes, regions of interest, or segments identified in the image 130. In some cases, the parent node representing region of interest 703A corresponds to the body segment 403 of the image 130. As described in FIG. 4, the body segment 403 refers to a rectangular box enclosing the entire person (or one person in the case of a multi-person image) shown in the image 130.

From the parent node representing the parent attribute of the region of interest 703A, there may be multiple leaf nodes that represent other regions of interest 703B that have a dependency with region of interest 703A. As shown in FIG. 7, region of interest 703B is a leaf node to the region of interest 703A because a segment corresponding to the region of interest 703B may be positioned within the segment corresponding to region of interest 703A.

From the parent node representing the parent attribute of the region of interest 703A, there may also be multiple leaf nodes that represent the attributes 251 that have a dependency with region of interest 703A. As shown in FIG. 7, positional attributes 260A and 260B are leaf nodes to the region of interest 703A because positional attributes 260A and 260B describe positional features of the region of interest 703A.

As shown in FIG. 7, the region of interest 703B includes four leaf nodes, one for a positional attribute 260C and three leaf nodes for different regions of interest 703C-E. The positional attribute 260C may have a dependency with (or describe a feature of) the region of interest 703B. The regions of interest 703C-E may have a dependency with (or be positioned inside of) the region of interest 703B. Similarly, each of the regions of interest 703C-E have leaf nodes representing various feature attributes 255A-D that describe features of the regions of interest 703C-E.

In some embodiments, scoring tree 700 may include a weight 290A-K for each of the nodes within the scoring tree 700, except for the top-most parent node. All of the nodes in scoring tree 700 include a weight 290A-K except for the node representing the region of interest 703A.

A weight 290A-K is a value between 0 and 1 that may be assigned to certain segments or regions of interest 703A-E corresponding to the segments. The weights 290A-K may also be a value between 0 and 1 that is assigned to attributes 251, such as feature attributes 255, positional attributes 260, group attributes 265, generic attributes 270, action behavior attributes 266, objective attributes, or any features of an image 130. The weight 290A-K may indicate a proportion of weight that a certain segment, region of interest 703A-E, or attribute 251 is given in computing the aggregate score 285 for an image 130.

In some embodiments, the weights 290 may be determined in a manner similar to the way the scores 280 for an image are determined. Professional photographers located at the service provider 109 may determine a percentage or proportional value that a certain part (e.g., segment, region of interest 703A-E, feature attribute 255, positional attribute 260, group attribute 265, generic attribute 270, action behavior attribute 266, or other attributes/features) of a prototype image 123 provides with relation to an overall aesthetic value of the prototype image 123. Each of the prototype images 123 may be analyzed to determine how proportionally relative each of the segments, regions of interest 703A-E, feature attributes 255, positional attributes 260, group attributes 265, generic attributes 270, action behavior attributes 266, or other attributes/features are with relation to a total aesthetic value of the prototype images 123. Based on this, the service provider 109 may store pre-defined weights 253 that may correspond to the segments, regions of interest 703A-E, feature attributes 255, positional attributes 260, group attributes 265, generic attributes 270, action behavior attributes, or other attributes/features of an image 130. The service provider 109 may send these pre-defined weights 253 to the computing device 103 in the trained data 120 such that the computing device 103 may use the pre-defined weights to determine actual weights 290 for an image 130.

In some cases, the actual weights 290 for one image 130 may not actually match a pre-defined weight 253 from the trained data 120. This is because every image 130 does not include the same segments and features. Therefore, computing devices 103 may compute weights 290 for a particular image 130 using the pre-defined weights 253 relatively based on all of the segments, regions of interest 703A-E, feature attributes 255, positional attributes 260, group attributes 265, generic attributes 270, action behavior attributes 266, or other attributes/features that are scored in the image 130.

As shown in FIG. 7A, weights 290A-K are assigned to all of the nodes in the scoring tree 700. In some embodiments, all of the leaf nodes stemming from a single node and in one horizontal level of the scoring tree 700 should equal to 1. The aggregation of weights 290A-C should equal 1 because the nodes for the region of interest 703B, positional attribute 260A, and positional attribute 260B stem from the node for the region of interest 703A. The aggregation of weights 290D-E should equal 1 because the nodes for the positional attribute 260C and regions of interest 703C-E stem from the node for the region of interest 703B.

The node for region of interest 703C only has one leaf node for the feature attribute 255A. The feature attribute 255A may be assigned a weight 290H of 1. Similarly, the node for region of interest 703E only has one leaf node for the feature attribute 255D. The feature attribute 255D may also be assigned a weight 290K of 1. The node for region of interest 703D has two leaf nodes for feature attributes 255B and 255C. In this case, the aggregation of weight 290I and 290K may equal 1.

In some embodiments, an aggregate score 285 may be computed based on the scoring tree 700 using the scores 280 for each of the nodes in the scoring tree 700 and the weights 290A-K for each of the nodes in the scoring tree 700. A score 280 may be calculated for each of the regions of interest 703A-E, positional attributes 260A-C, and feature attributes 255A-D shown in the scoring tree 700. The aggregate score 285 may be computed by first determining weighted scores 280 for each node in the scoring tree 700 by multiplying each score 280 by the corresponding weight 290A-K, and then computing an aggregation of the weighted scores 280.

In some embodiments, the structure of the scoring tree 700 is such that when additional features of an image 130 are to be considered for scoring, the weights 290A-K for the features may be easily adjusted to account for the scoring of the new feature. In some embodiments, the weights 290A-K may be readjusted based on the pre-defined weights 253 and the total weights in a horizontal level in the scoring tree 700.

For example, suppose that a certain positional attribute 260E that was not previously considered for an aggregate score 285 is now to be considered in computing a new aggregate score 285. Suppose that the positional attribute 260E defines a certain feature of the region of interest 703B. In this case, a leaf node may be added to the region of interest 703B. Similarly, the weights 290D-G may be recomputed to add another weight 290 for the new positional attribute 260E based on the pre-defined weights 253 while ensuring that the aggregation of the weights 290D-G and the new weight 290 is still equal to 1. In this way, no other weights 290 or scores 280 need to be adjusted to compute the new aggregate score 285.

Figure 7B:
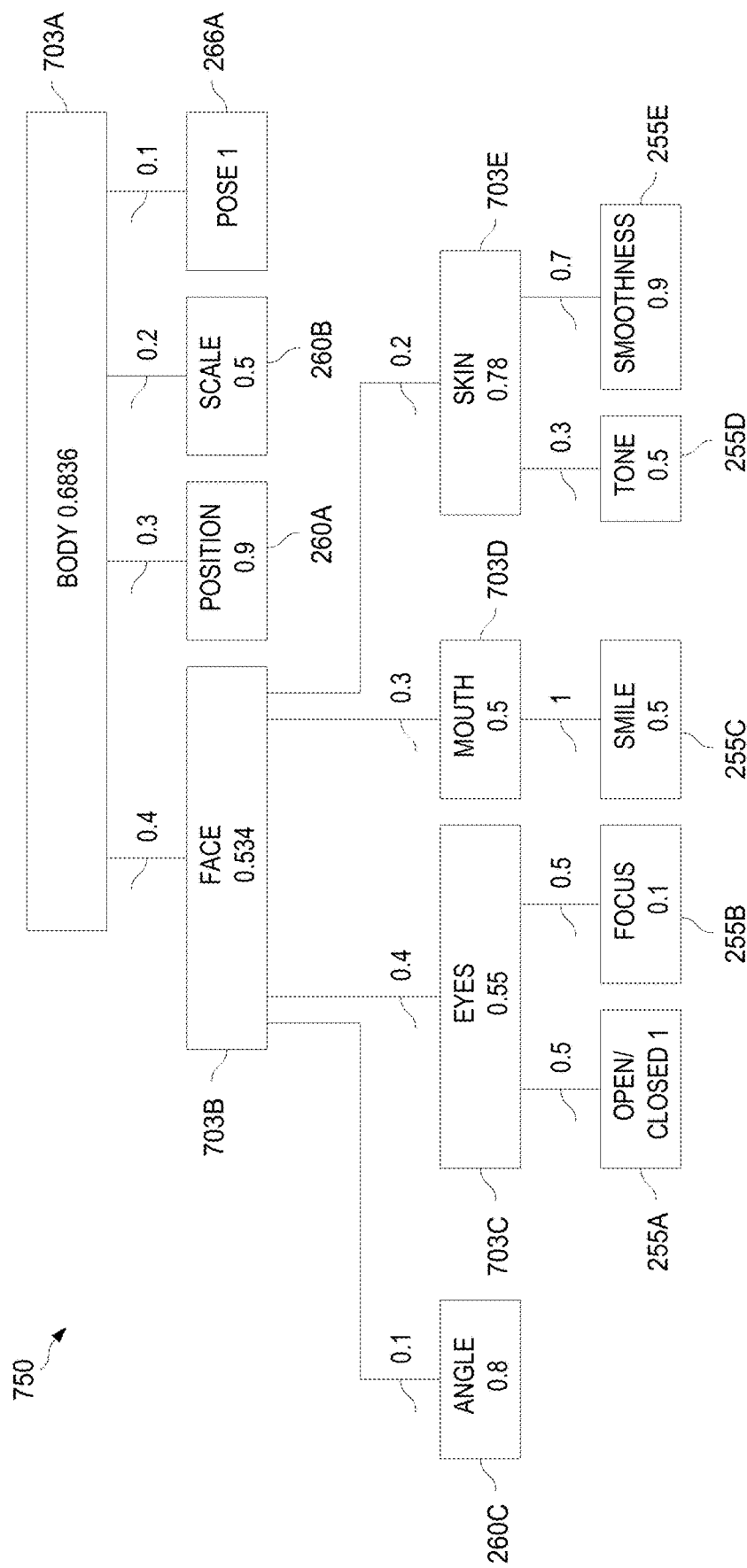
FIG. 7B illustrates an example of a scoring tree for an image.

FIG. 7B illustrates an example of a scoring tree 750 for an image 130. As shown in FIG. 7B, the region of interest 703A representing the parent node of the parent attribute of the scoring tree 750 corresponds to the body segment 403 of the image 130. The parent node (parent attribute) corresponding to the body segment 403 has a score 280 of 0.6836. The node representing the region of interest 703A has four leaf nodes, one for the region of interest 703B (the face segment 406), two for positional attributes 260A and 260B, and one for an action behavior attribute 266A. The region of interest 703B has a dependency with the region of interest 703A because the face segment 406 is located within the body segment 403. The node representing the region of interest 703B has a score 280 of 0.534, and has a weight 290 of 0.4.

The positional attributes 260A and 260B may describe a positioning of the body segment 403, and thus, has a dependency with the region of interest 703A. The positional attribute 260A describes a position of the person within the image 130, and the positional attribute 260B describes a scale of the person relative to the size of the image 130. The positional attribute 260A has a score 280 of 0.9 and a weight 290 of 0.3. The positional attribute 260B has a score 280 of 0.5 and a weight 290 of 0.2. The action behavior attribute 266A may describe a pose performed by the body segment 403 of the person depicted in the image 130, and thus, has a dependency with the region of interest 703A. The action behavior attribute 266A has a score 280 of 1 and weight 290 of 0.1.

The node representing the region of interest 703B (face segment 406) may have four leaf nodes, one for the region of interest 703C (eyes segment 409), one for the region of interest 703D (mouth segment 411), one for the region of interest 703E (a skin segment), and one for a positional attribute 260C. The positional attribute 260C may describe an angle of the face, and thus, has a dependency with region of interest 703B. The positional attribute 260C has a score 280 of 0.8 and a weight 290 of 0.1.

The regions of interest 703C-E have a dependency relationship with the region of interest 703B because the eyes segment 409, the mouth segment 411, and the skin segment may be positioned within the face segment 406. The region of interest 703C (eyes segment 409) has a score 280 of 0.55 and a weight 290 of 0.4. The region of interest 703D (mouth segment 409) has a score 280 of 0.5 and a weight 290 of 0.3. The region of interest 703E (skin segment) has a score 280 of 0.78 and a weight 290 of 0.2.

The node representing the region of interest 703C (eyes segment 409) has two leaf nodes for feature attributes 255A and 255B. The feature attribute 255A represents whether the eyes in the eyes segment 409 are open or closed, and the feature attribute 255B represents how focused the eyes in the eyes segment 409 are in the image 130. In this way, the feature attributes 255A and 255B have a dependency with the region of interest 703C because the feature attributes 255A and 255B define features of the region of interest 703C. The feature attribute 255A has a score 280 of 1 and a weight 290 of 0.5. As described above, the score 280 of 1 for the eyes segment 409 may indicate that the eyes shown in the eyes segment 409 are open. The feature attribute 255B has a score 280 of 0.1 and a weight 290 of 0.5. For example, this low score 280 of 0.1 for the focus of the eyes may indicate that the eyes are not focused on the camera capturing the image 130, or that the pixels in the eyes segment 409 are not focused.

The node representing the region of interest 703D (mouth segment 411) has one leaf node for feature attribute 255C, which represents whether the mouth in the mouth segment 411 is smiling or not. In this way, feature attribute 255C has a dependency with the region of interest 703D because feature attribute 255C defines features of the region of interest 703D. The attribute 255C has a score 280 of 0.5 and a weight 290 of 1 (since there are no other leaf nodes that stem from the node for the region of interest 703D). The score 280 of 0.5 for the mouth segment 411 may indicate that the person portrayed in the image 130 is not fully smiling or is apathetic.

The node representing the region of interest 703E (skin segment) has two leaf nodes for feature attributes 255D and 255E. The feature attribute 255D represents a skin tone, and the feature attribute 255E represents a smoothness of the skin. In this way, the feature attributes 255D and 255E have a dependency with the region of interest 703E because the feature attributes 255D and 255E define features of the region of interest 703E. The feature attribute 255D has a score 280 of 0.5 and a weight 290 of 0.3. The feature attribute 255E has a score 280 of 0.9 and a weight 290 of 0.7.

As shown in scoring tree 750, the aggregation of the weights 290 of leaf nodes stemming from a single node should equal 1. The aggregation of the leaf nodes stemming from the parent node representing the region of interest 703A is 1 (0.4+0.3+0.2+0.1). The aggregation of the leaf nodes stemming from the node representing the region of interest 703B is 1 (0.1+0.4+0.3+0.2). The aggregation of the leaf nodes stemming from the node representing the region of interest 703C is 1 (0.5+0.5). The aggregation of the leaf node stemming from the node representing the region of interest 703D is also 1 since there is only a single leaf node representing feature attribute 255C. The aggregation of the leaf nodes stemming from the node representing the region of interest 703D is 1 (0.3+0.7).

The aggregate score 285 may be computed by weighting and aggregating all the scores 280 for all of the nodes (representing segments, regions of interest 703A-E, feature attributes 255, positional attributes 260, group attributes 265, generic attributes 270, action behavior attributes 266 or other attributes/features of the image 130). If the aggregate score 285 includes the aggregation of all the scores 280, the aggregate score 285 for the image 130 represented by scoring tree 750 is 9.2476 (0.6836+0.534+0.9+0.5+1+0.8+ 0.55+0.5+0.78+1+0.1+0.5+0.5+0.9). If the aggregate score 285 includes the aggregation of all the weighted scores 280 (the score 280 multiplied by the corresponding weight 290), the aggregate score 285 for the image represented by the score tree 750 is 3.0832 ((0.6836)+(0.534×0.4)+(0.9×0.3)+ (0.5×0.2)+(1×0.1)+(0.8×0.1)+(0.55×0.4)+(0.5×0.3)+(0.78× 0.2)+(1×0.5)+(0.1×0.5)+(0.5×1)+(0.5×0.3)+(0.9×0.7)).

The scoring tree 700 is just an example of a data structure that may be used to generate an aggregate score 285 for an image 130. As should be appreciated, any other type of data structure or trained model in which additional attributes 251 or features of the image 130 may be easily factored into the aggregate score 285 according to weights 290 may be used to determine the aggregate score for an image 130.

Figure 8A:
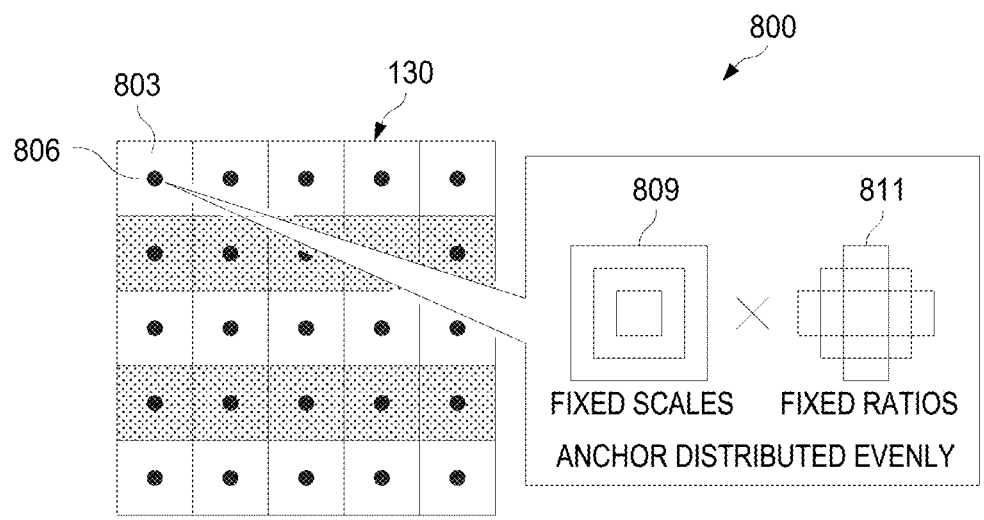
FIGS. 8A-B are diagrams and illustrating methods of segmentation and object classification according to various embodiments of the disclosure.
Figure 8B:
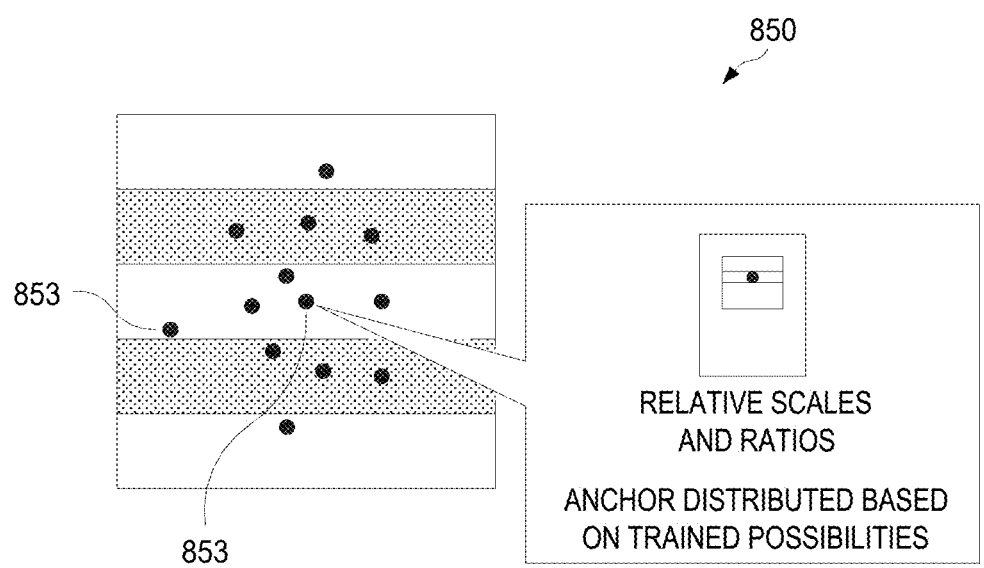

FIGS. 8A-B are diagrams 800 and 850 illustrating methods of segmentation and object classification according to various embodiments of the disclosure. Diagram 800 illustrates a traditional method of determining segments in an image 130. One of the initial steps in segmenting an image 130 is the use of region proposal networks (RPNs), which involves searching an image 130 for possible segments using a sliding window from a left top corner of the image 130 to a right bottom corner of the image 130. The sliding window is a sliding rectangular box that is resized and rescaled for multiple iterations of sliding across the entire image 130. During each iteration, the sliding window is moved across the entire image 130 until the segments have been identified.

FIG. 8A is a diagram 800 showing the traditional methods of identifying segments using a sliding window 803 when implementing RPN. The anchor 806 represents the center point of the sliding window 803 as it moves over time. The sliding window 803 is positioned across the entire image 130 at a first scale 809 (size of the sliding window 803) and a first ratio 811 (dimensions of the sliding window 803) for a first iteration. After the first iteration, the scale 809 and the ratio 811 may be changed, and the sliding window 803 is again moved across the entire image 130 to identify segments. Several iterations are performed by altering the scale 809 and ratio 811 of the sliding window 803 to determine proposals (or proposed segments) that may enclose the regions of interest 703A-E. Regression may be performed on the proposed segments to perform corrections on the proposed segments and ensure that the segments are enclosing the region of interest proximate to the edges of the regions of interest. Classification may then be performed on the segment to label the segment and determine the attributes 251.

Traditional methods of RPN using the sliding window 803 are inefficient because the sliding window 803 is often positioned in edges and areas of the image 130 where it is unlikely for regions of interest 703A-E to be located. For this reason, processors 205 spend a large amount of time trying to define proposed segments for areas in the image 130 that are irrelevant to the portrait image analysis embodiments disclosed herein.

FIG. 8B is a diagram 850 showing a more efficient method of identifying segments using the updated anchors 853 based on a likelihood of a region of interest being positioned near the updated anchors 853. The updated anchors 853 may be used when implementing RPN according to the various embodiments disclosed herein. In some embodiments, the trained data 120 may include pre-defined anchors that are based on a likelihood that certain regions of interest 703A-E will be positioned in the image 130. The pre-defined anchor for a segment defining a person body (body segment 403) may be more likely to be positioned in the middle of the image 130. The updated anchor 853 for a sliding window 803 that is used for a first iteration of RPN may be positioned according to the pre-defined anchor. The updated anchor 853 shown in FIG. 8B may be the anchor for a sliding window 803 that is used to identify a segment corresponding to the body.

In some embodiments, the number of iterations of using the sliding window 803 may be reduced since the likelihood of identifying the segment for a region of interest 703A-E is higher. In this way, the number of scales 809 and ratios 811 used for the various iterations of moving the sliding window 803 across the image 130 is also reduced.

Similar pre-defined anchors may be included in the trained data 120 for the various regions of interest 703A-E that are segmented and analyzed for use in the portrait image analysis mechanisms disclosed herein. The trained data 120 may include a pre-defined anchor that points to a specific portion or point in the image 130 where the face of the person would be located, where the eyes of the person would be located, where the mouth of the person would be located, etc. Using these embodiments for segmenting, the number of proposed segments that are identified would significantly decrease, and the time that it takes to process the image 130 would also significantly decrease. The mechanisms for portrait image analysis may thus be implemented in a much faster manner if these embodiments of segmentation are utilized.

Figure 9A:
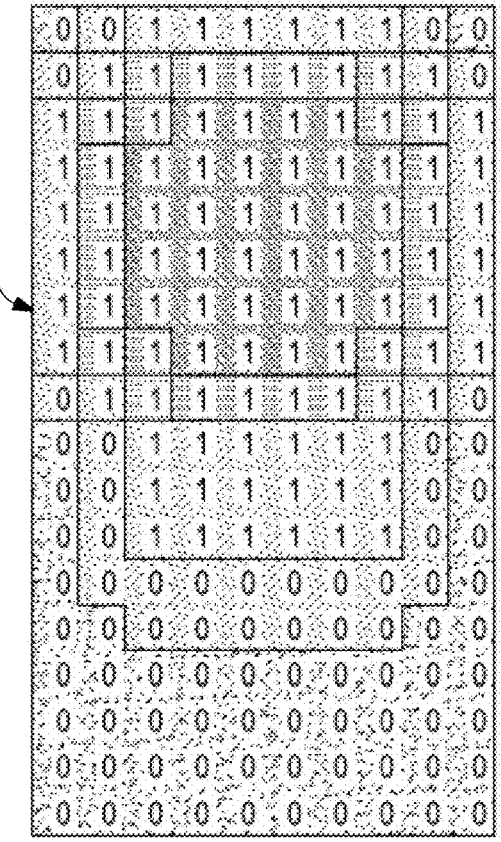
FIGS. 9A and 9B are diagrams illustrating how to identify positions within an image that are likely to show certain regions of interest according to various embodiments of the disclosure.
Figure 9A:
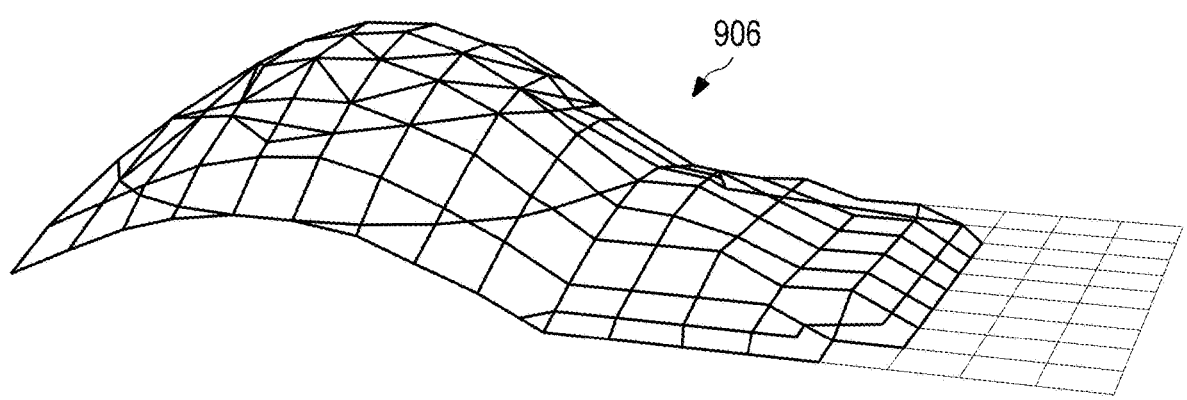
Figure 9B:
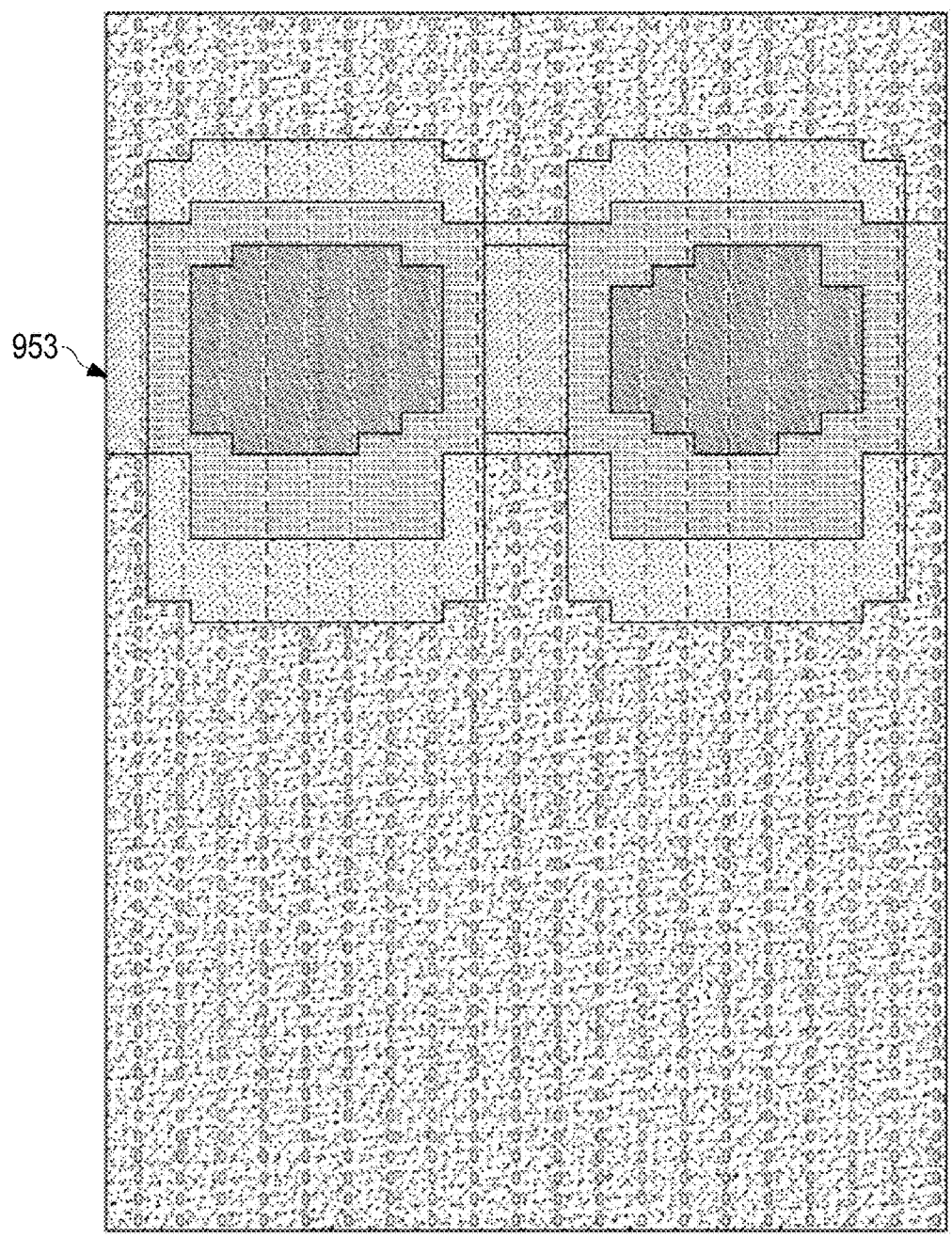
Figure 9B:
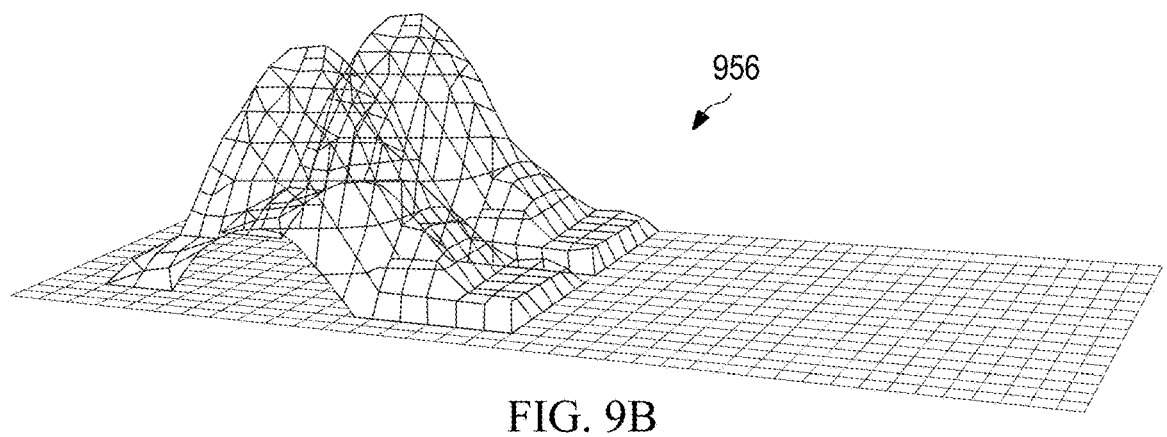

FIGS. 9A and 9B show diagrams illustrating how to identify positions within an image 130 that are likely to show certain regions of interest 703A-E according to various embodiments of the disclosure. FIG. 9A shows a heat diagram 903 and a three dimensional (3D) diagram 906 illustrating the position within an image 130 that a segment corresponding to an upper body would be likely to be positioned. These diagrams 903 and 906 may be generated based on analysis of the prototype images 123. Similarly, FIG. 9B shows a heat diagram 953 and a 3D diagram 956 illustrating the position within the image 130 that a segment corresponding to the eyes (eyes segment 409) would be likely to be positioned. These diagrams 953 and 956 may also be generated based on analysis of the prototype images 123.

Figure 10:
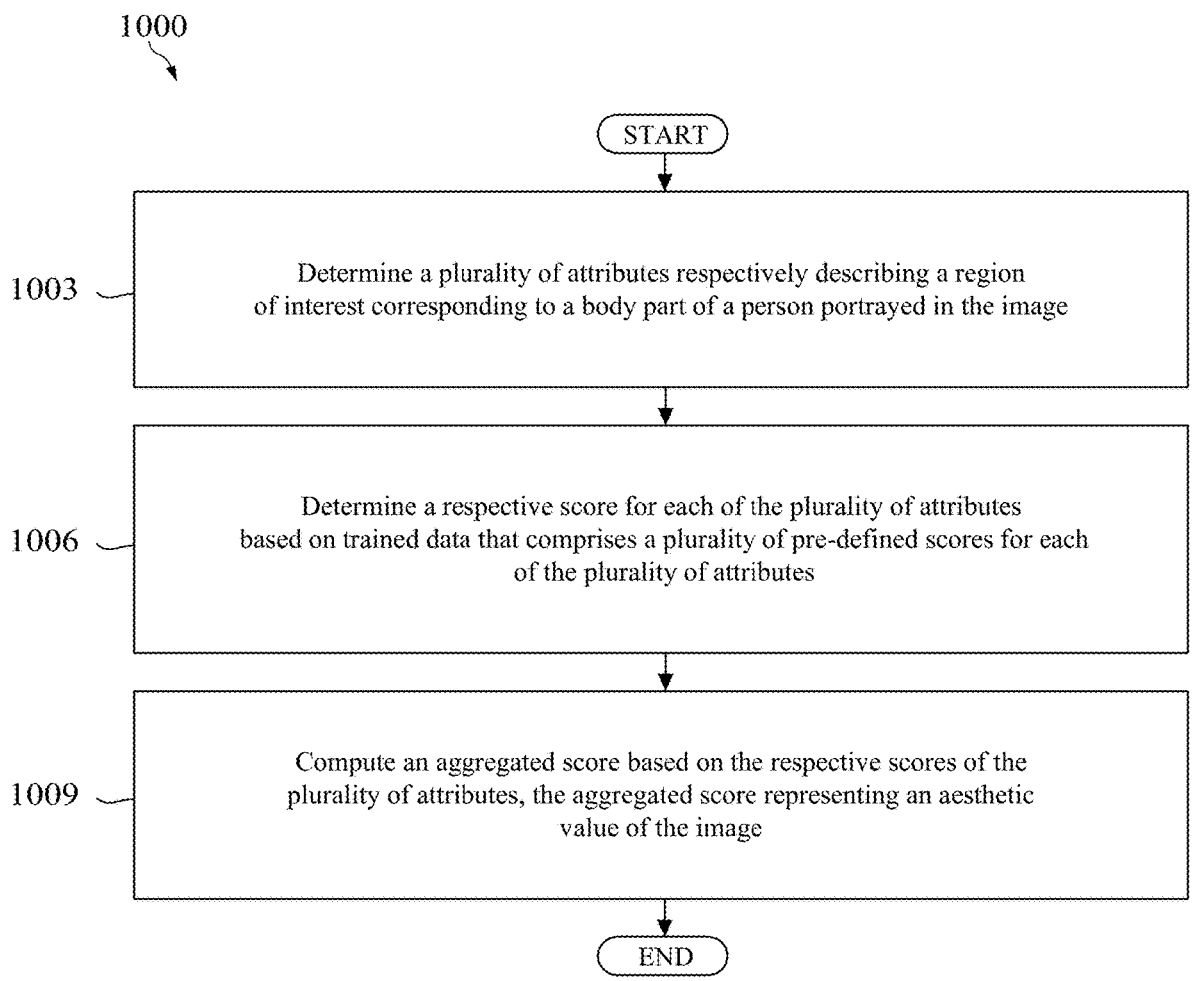
FIG. 10 is a flowchart of a method of performing portrait image analysis according to various embodiments of the disclosure.

FIG. 10 is a flowchart of a method 1000 of performing portrait image analysis according to various embodiments of the disclosure. Method 1000 may be performed by the portrait image analysis module 125 after obtaining an image 130 to be analyzed and scored. At step 1003, a plurality of attributes 251 that respectively describe a plurality of regions of interest corresponding to a body part of a person portrayed in the image 130 are determined. The processor 205 executes the portrait image analysis module 125 to determine the attributes 251 in an image 130 based on segments identified in the image 130. The attributes 251 identified may be feature attributes 255, positional attributes 260, generic attributes 270, group attributes 265, action behavior attributes 266, objective features of the image 130, and/or other features describing the image 130.

At step 1006, a respective score 280 may be determined for each of the attributes 251 based on trained data 120. The processor 205 executes the portrait image analysis module 125 to determine a respective score 280 for each of the attributes 251 based on the pre-defined scores 252 stored in the trained data 120. The pre-defined scores 252 are preset scores for various attributes based on prototype images 123. In some embodiments, each of these scores 280 may be weighted according to weights 290 assigned for each of the attributes 251 that are being scored. In an embodiment, the weights 290 for each of the attributes 251 are based on pre-defined weights 253 included in the trained data 120.

At step 1009, an aggregate score 285 is computed based on the respective scores 280 of the attributes 251. The processor 205 executes the portrait image analysis module 125 to compute the aggregate score 285 based on the respective scores 280 of the attributes 251. The aggregate scores 285 may be an aggregation of the scores 280 of the attributes 251. The aggregate scores 285 may also be an aggregation of the scores 280 after being weighted according to the weights 290 of the attributes 251.

Figure 11:
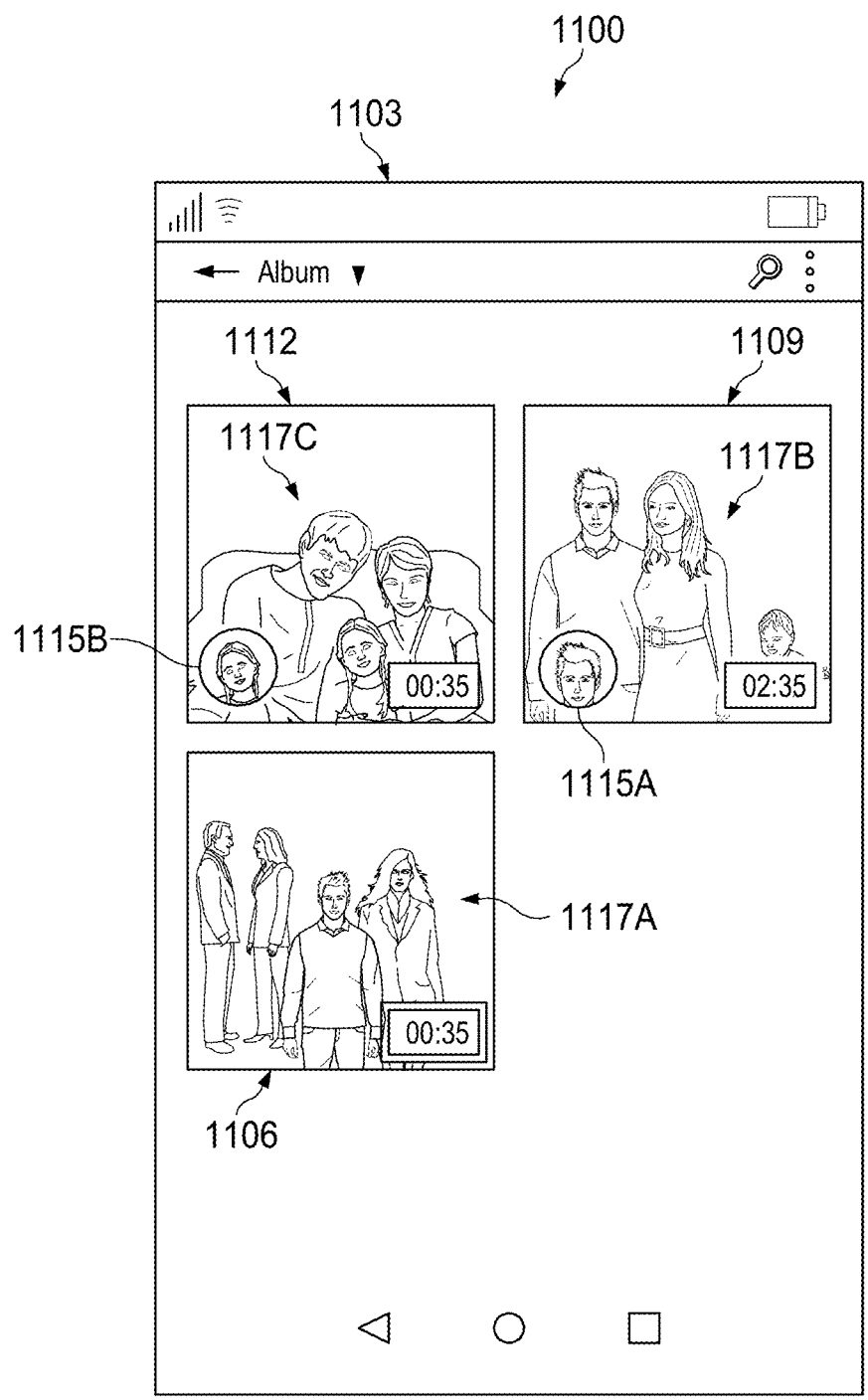
FIG. 11 is a schematic diagram of an album comprising an original video and one or more summarization videos based on a person depicted in the original video according to various embodiments of the disclosure.

FIG. 11 is a schematic diagram 1100 of album 1103 comprising an original video 1106 and one or more summarization videos 1109 and 1112 based on a person depicted in the original video 1106 according to various embodiments of the disclosure. The original video 1106 may comprise a series of one or more images 130, in which some of these images 130 may be multi-person portrait images. The original video 1106 may be shown in the album 1103 using a cover image 1117A, which may be selected based on the methods of performing portrait image analysis as described above. For example, the image 130 of the original video 1106 having the highest aggregate score 285 may be the cover image 1117A for the original video 1106.

Each of the summarization videos 1109 and 1112 may be videos that include a series of images 130 (e.g. frames) from the original video 1106 displaying a selected person. In an embodiment, the computing device 200 of FIG. 2 may be configured to generate summarization videos 1109 and 1112 from the original video 1106 based on a particular person shown in the original video 1106. For example, a user of the computing device 200 may watch the original video 1106 and then access an information page of the original video 1106. An information page for the original video 1106 may show thumbnails for each person depicted in the original video 1106. For example, an information page for the original video 1106 may include thumbnails for each person depicted in at least a threshold number of images 130 within the original video 1106. An example of an information page is further described below with reference to FIG. 12.

The user accessing the information page of the original video 1106 may select one of the thumbnails corresponding to a person depicted in the original video 1106 to create a summarization video 1109 or 1112 for the selected person. For example, the information page for the original video 1106 may include a thumbnail 1115A for a man depicted in the original video 1106 and a thumbnail 1115B for a young girl depicted in the original video. The user accessing the information page of the original video 1106 may select both of these thumbnails 1115A and 1115B at separate times to separately create the summarization videos 1109 and 1112 for the man corresponding to thumbnail 1115A and the young girl corresponding to thumbnail 1115B, respectively.

The summarization videos 1109 and 1112 may be created from the original video 1106 by first analyzing each of the images 130 that are part of the original video 1106 to determine the images 130 that include a selected person. For example, the summarization video 1109 may be created by first analyzing each of the images 130 that are part of the original video 1106 and include the man shown by thumbnail 1115A. Similarly, the summarization video 1112 may be created by first analyzing each of the images 130 that are part of the original video 1106 and include the young girl shown by thumbnail 1115B.

Next, a length of the summarization video 1109 or 1112 may be determined. For example, the summarization video 1109 or 1112 may be any length that is less than or equal to the length of the original video 1106. In some cases, there may not be a set maximum length for the summarization video 1109 or 1112. In this case, when the selected person is included in each image 130 of the original video 1106, the summarization video 1109 or 1112 may be the same as the original video 1106.

In some embodiments, the summarization video 1109 or 1112 may further include one or more transition images that inserted in between one or more images 130 included in the summarization video 1109 or 1112. The transition images may be used to make the video more affluent and smooth. For example, the transition image may be other images selected from the video that include the same person, or some pre-set images only for the target of transition.

In the case in which a maximum length, such as, for example, 10 seconds, is set for the summarization videos 1109 and 1112, then one or more of the images 130 that include the selected person may be combined to create the summarization videos 1109 or 1112. In some cases, the selected person may be in the original video 1106 for less time than the maximum length set for the summarization video 1109 and 1112. When a combination of all the images 130 that include the selected person creates a summarization video 1109 or 1112 that is less than or equal to the maximum length, then the summarization video 1109 or 1112 includes all the images 130 that portray the selected person.

When the combination of all the images 130 that include the selected person creates a summarization video 1109 or 1112 that is greater than the maximum length, then the summarization video 1109 or 1112 may include a subset of the images 130 that portray the selected person. In an embodiment, the subset of the images 130 included in the summarization video 1109 or 1112 may be selected randomly from all of the images 130 that portray the selected person in the original video 1106. In an embodiment, the subset of the images 130 included in the summarization video 1109 or 1112 may be selected based on the aggregate score 285 of each of the images 130 that portray the selected person in the original video. In an embodiment, the aggregate score 285 may be calculated for each of the images 130 in a manner similar to that described above with reference to FIGS. 3-10.

In an another embodiment, the aggregate score 285 may be calculated based solely on the selected person in which the image is analyzed as a single person portrait image 130, without considering the group-attributes of the image 130, or the feature attributes 225, generic attributes 270, positional attributes 260, or action behavior attributes 266 for any of the other people in the image. In an embodiment, the people in the image 130 other than the selected person may be considered as background features of the image and thus, may only be analyzed based on objective features. Subjective features of the other people in the image 130 other than the selected person may not be evaluated for consideration in the aggregate score 285. An example of computing an aggregate score 285 for an image 130 based solely on the selected person is further described below with reference to FIG. 13.

The selected person for a particular summarization video 1109 or 1112 may be indicated by a thumbnail 1115A or 1115B depicted in the bottom left corner of a cover image 1117B-C for the summarization video 1109 or 1112. As shown in FIG. 11, the summarization video 1109 includes the thumbnail 1115A at the bottom left corner of the cover image 1117B for the summarization video 1109. Similarly, the summarization video 1112 includes the thumbnail 1115B at the bottom left corner of the cover image 1117C for the summarization video 1112.

Each of the cover images 1117B-C for the summarization videos 1109 and 1112 may be selected from the images 130 that are part of the respective summarization video 1109 and 1112 based on an aggregate score 285 of the respective summarization video 1109 and 1112. In one embodiment, the aggregate score 285 for a summarization video 1109 or 1112 may be calculated similar to the methods described above for multi-person portrait images 130 that are part of a video. In one embodiment, the aggregate score 285 for a summarization video 1109 or 1112 may be calculated by analyzing the images 130 within the summarization video 1109 or 1112 as a single person portrait image 130 and ignoring all of the other people in the images 130 within the summarization video 1109 or 1112 except for the selected person for the summarization video 1109 or 1112.

An example of analyzing the images 130 within the summarization video 1109 or 1112 as a single person portrait image 130 is further described below with reference to FIG. 13. In an embodiment, when the user selects an image 130, an original video 1106, or a summarization video 1109 and 1112 from the album 1103, the user may be redirected to the information page corresponding to the selected video or image 130.

Figure 12:
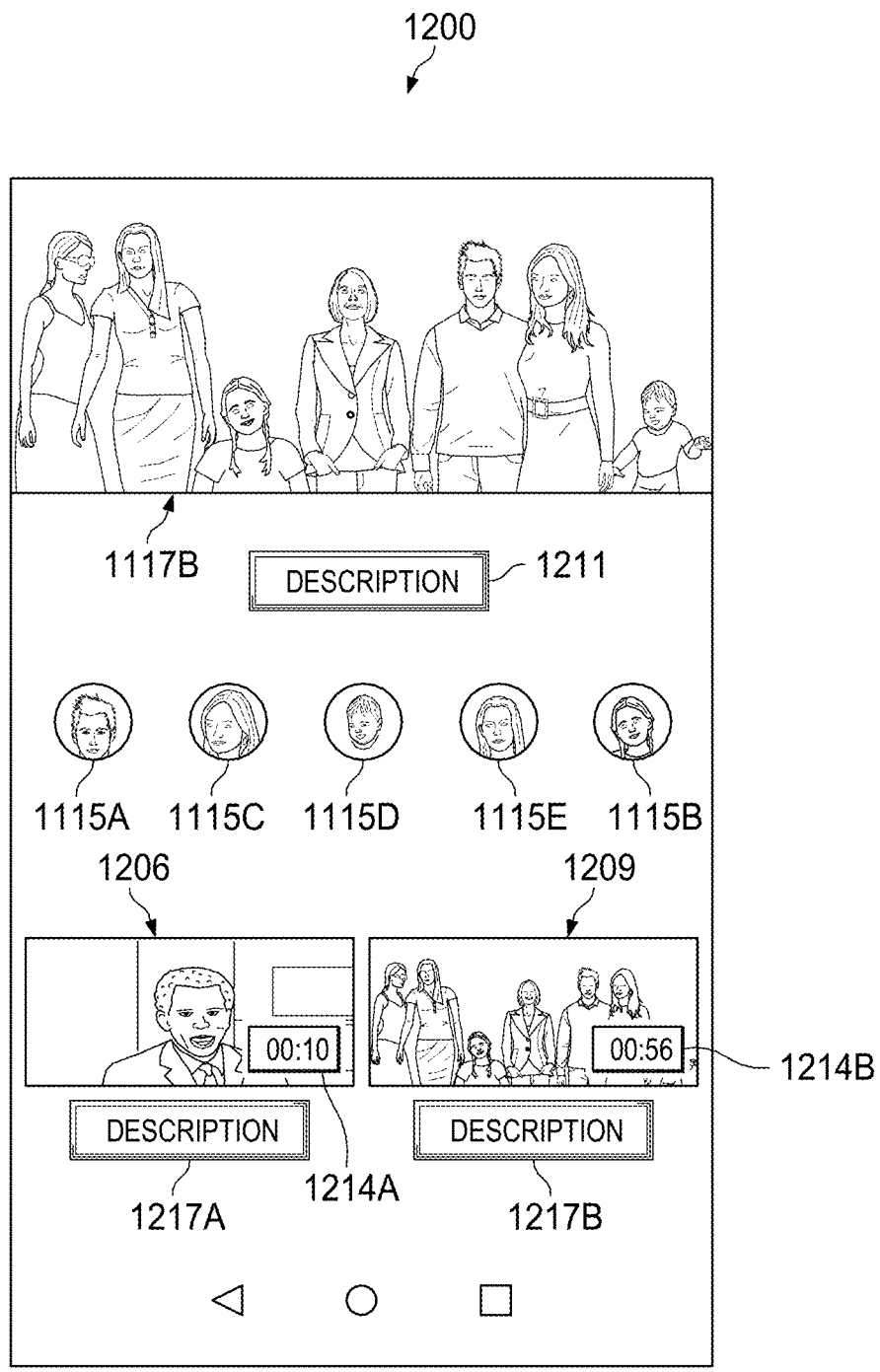
FIG. 12 is a schematic diagram of an information page for the summarization video according to various embodiments of the disclosure.

FIG. 12 is a schematic diagram of an information page 1200 for the summarization video 1109 according to various embodiments of the disclosure. As described above, an information page 1200 includes several types of details associated with the video being described, which in this case is the summarization video 1109. As shown in FIG. 12, the information page 1200 for the summarization video 1109 includes the cover image 1117B, a description 1211, thumbnails 1115A-E of the various people depicted in the summarization video 1109, links to other summarization videos 1206 and 1209, and a respective description 1217A and 1217B for the other summarization videos 1206 and 1209.

As should be appreciated, the information page 1200 may include additional information not otherwise shown in FIG. 12.

The top of the information page 1200 shows the cover image 1117B, which, as described above, may be selected based on the image 130 that is part of the summarization video 1109 having the highest aggregate score 285. As described above, the aggregate score 285 may be scored as a collection of multi-person portrait images 130 that are part of the summarization video 1109, or the aggregate score 285 may be scored as a collection of single person portrait images 130 that are part of the summarization video 1109.

The description 1211 includes data or information that describes the summarization video 1109. For example, the description 1211 may include a name of the video, a length of the video 1214A, a location where the summarization video 1109 was recorded or received, a link to the original video 1106 from which the summarization video 1109 is based, and/or other data or metadata associated with the summarization video 1109. The thumbnails 1115A-E may be headshots of the various people that are shown in the summarization video 1109.

In an embodiment, the headshots used for the thumbnails 1115A-E are cropped out images of the respective person taken directly from one of the images 130 in the summarization video 1109. In an embodiment, the headshots used for the thumbnails 1115A-E may be pre-configured by the user from other videos or images that have been previously saved at the computing device 200.

In an embodiment, a thumbnail 1115A-E for a particular person may only be included in the information page 1200 when there are greater than or equal to a threshold number of images 130 in the summarization video 1109 that depicts the particular person. In an embodiment, no such threshold exists and thumbnails 1115A-E may be presented for every single person that is in the summarization video 1109. In this way, while only five thumbnails 1115A-E are shown by FIG. 12, it should be appreciated that any number of thumbnails 1115A-E for any number of people may be included in the information page 1200. In an embodiment, the portion of the information page 1200 showing the thumbnails 1115A-E may be configured to horizontally scroll to the right and left to access all of the thumbnails 1115A-E relevant to the summarization video 1109. In an embodiment, the portion of the information page 1200 showing the thumbnails 1115A-E may be configured to vertically scroll up and down to access all of the thumbnails 1115A-E relevant to the summarization video 1109.

In an embodiment, each of the these thumbnails 1115A-E may be a link to another summarization video 1109 or 1112 that focuses on the person corresponding to the thumbnail 1115A-E. As shown in FIG. 12, thumbnail 1115A refers to the man that is the central character or protagonist for the summarization video 1109. For this reason, the thumbnail 1115A may not be a link to any other summarization videos 1109 or 1112. However, thumbnails 1115B-E may be links to other summarization videos 1109 or 1112. For example, thumbnail 1115B shows a thumbnail image of the young girl that is included in the summarization video 1109. In an embodiment, when a user clicks the thumbnail 1115B, a new summarization video 1109 or 1112 may be created. The new summarization video 1109 or 1112 may include images 130 from the original video 1106 that include the young girl shown by thumbnail 1115B or images 130 from the summarization video 1109 that include the young girl shown by thumbnail 1115B.

Similarly, thumbnail 1115C shows a thumbnail image a school girl that is included in the summarization video 1109. In an embodiment, when a user clicks the thumbnail 1115C, a new summarization video 1109 or 1112 may be created. The new summarization video 1109 or 1112 may include images 130 from the original video 1106 that include the school girl shown by thumbnail 1115C or images 130 from the summarization video 1109 that include the school girl shown by thumbnail 1115C.

Thumbnail 1115D shows a thumbnail image a young boy that is included in the summarization video 1109. In an embodiment, when a user clicks the thumbnail 1115D, a new summarization video 1109 or 1112 may be created. The new summarization video 1109 or 1112 may include images 130 from the original video 1106 that include the young boy shown by thumbnail 1115D or images 130 from the summarization video 1109 that include the young boy shown by thumbnail 1115D.

Thumbnail 1115E shows a thumbnail image a woman that is included in the summarization video 1109. In an embodiment, when a user clicks the thumbnail 1115E, a new summarization video 1109 or 1112 may be created. The new summarization video 1109 or 1112 may include images 130 from the original video 1106 that include the woman shown by thumbnail 1115E or images 130 from the summarization video 1109 that include the woman shown by thumbnail 1115E.

The links to the other summarization videos 1206 and 1209 are shown at the bottom of the information page 1200. The links to the other summarization videos 1206 and 1209 may also be associated with the selected person for the summarization video 1109 but may have different lengths 1214A and 1214B, and thus, be different videos. For example, the summarization video 1206 may have a length 1214A ten seconds, and the summarization video 1209 may be have a length 1214B of 56 seconds, which may be sufficient to include all of the images 130 from the original video 1106 that includes the man shown by thumbnail 1115A (e.g., no set maximum length for the video).

The summarization video 1206, having a maximum length, may include images 130 from the original video 1106 that have an aggregate score 285 greater than a threshold score. The threshold score may be preset by the user and changed periodically or pre-configured by the computing device. The aggregate score 285 for each of the images 130 from the original video 1106 may be computed based on the images 130 being multi-person portrait images 130 or based on the images being single person portrait images 130 in which the single person being evaluated is the selected person. In the case of the summarization video 1206, the single person being evaluated is the man shown by thumbnail 1115A.

The information page 1200 may be displayed on a display of the computing device 200 in a variety of ways. In an embodiment, when a user selects a video from the album 1103, the video itself may be displayed on a display of the computing device 200. A scroll up link may be displayed at the bottom of the screen that displays the video. The scroll up link may be selected by user to display the information page 1200. For example, a user may perform a swipe up motion on the scroll up link to display the information page 1200 for a particular video. Similarly, there may be any type of link displayed in association with a video that a user may select to access the information page 1200 associated with the video.

Figure 13:
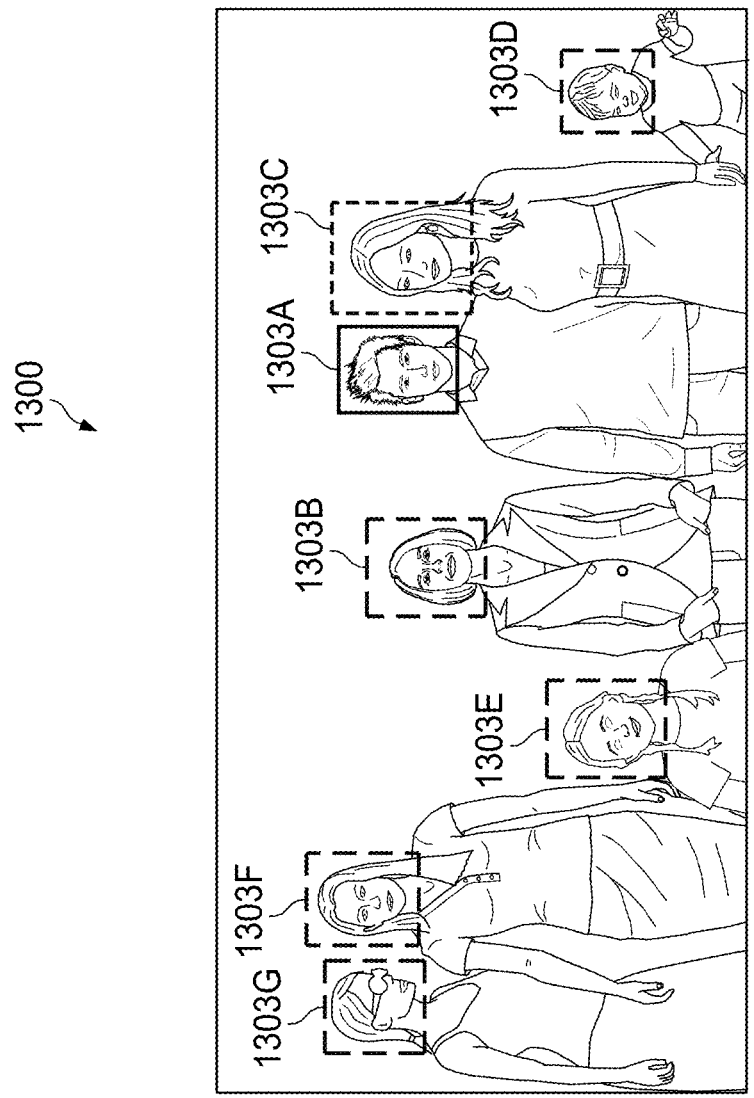
FIG. 13 is a schematic diagram illustrating a method of evaluating an image that is a multi-person portrait image as a single person portrait image according to various embodiments of the disclosure.

FIG. 13 is a schematic diagram of image 1300 illustrating a method of evaluating an image 130 showing multiple people as a single person portrait image 130 according to various embodiments of the disclosure. The image 1300 shown in FIG. 13 is similar to the cover image 1117B, but will be referred to as image 1300 for purposes of discussing how to analyze the image 1300 as a single person portrait image 1300.

As shown in FIG. 13, image 1300 is a multi-person portrait image 1300 in which multiple people 1303A-G are the central focus of the image 1300, rather than a background or landscape being a central focus of the image 1300. Based on the methods of performing portrait image evaluation discussed above with regard to FIGS. 3-10, a multi-person portrait image 1300 is evaluated and scored based on several different attributes 251 for each person shown in the multi-person portrait image. For example, when evaluating the image 1300 shown in FIG. 13 based on the methods of performing portrait image evaluation discussed above with regard to FIGS. 3-10, the group attributes 265 for all of the people shown in the multi-person portrait image 1300 and the feature attributes 255, generic attributes 270, positional attributes 260, and action behavior attributes 266 for each person shown in the multi-person portrait image 1300 are used to create the aggregate score 285.

In an embodiment, image 1300 may be scored as a single person portrait image 1300 even though the image 1300 is a multi-person portrait image 1300 when the user has selected a single person in the image 1300 as being a central focus, or protagonist, of the image 1300 (which may also be part of a video). In such a case, evaluation of the image 1300 may involve an analysis of the feature attributes 255, generic attributes 270, positional attributes 260, and action behavior attributes 266 for the selected person only. The feature attributes 255, generic attributes 270, positional attributes 260, and action behavior attributes 266 of the other people in the image 1300 may not need to be considered for purposes of scoring. The group attributes 265 may also not need to be considered for purposes of scoring. Instead, the parts of the image 1300 that show other people aside from the selected person may be considered as a background of the image 1300. As described above, the background of the image may be evaluated for objective features, such as, brightness, contrast, saturation, sharpness, hue, and tint. The subjective features of the other people in the image 1300 are not relevant to the aggregate score 285 computed for the image 1300.

Referring to image 1300 shown in FIG. 13, image 1300 is clearly a multi-person portrait image 1300 showing seven people 1303A-G. However, when a user selects one of these people as the central focus, or protagonist, of the image 1300, then the image 1300 may be evaluated and scored as a single person portrait image 1300 based on the selected person. A person 1303A-G may be selected by a user as being the protagonist of the image 1300 and thus focus of the evaluation of the image 1300. That is, the user only cares about the quality of the selected person in the image. The quality of the other people in the image 1300 may be irrelevant.

For example, suppose that the user selects person 1303A (corresponding to the man shown by thumbnail 1115A) as the focus of the image 1300 to compute the aggregate score 285 for the image 1300. In this case, the aggregate score 285 may be based on a score 280 computed for the feature attributes 255, the generic attributes 270, the positional attributes 260, and/or the action behavior attributes 266 of the person 1303A selected by the user. As described above with regard to FIGS. 3-10, the scores 280 may be based on regions of interest of the person 1303A selected and based on the trained data 120.

In this case, the other people 1303B-G are not analyzed or scored to contribute to the aggregate score 285. The group attributes 265 defining arrangements and spatial relationships between the people 1303A-G are also not considered. Rather, the parts of the image 1300 showing the other people 1303B-G are considered as a background of the image 1300, and the objective factors of the background of the image 1300 are also scored based on trained data 120 and factored into the aggregate score 285 for the image 1300.

The aggregate score 285 for the image 1300 with the central focus being the selected person 1303A may have a higher score than the aggregate score 285 for the image 1300 with the central focus being person 1303G. The person 1303A shown in image 1300 exhibits better feature attributes 255 and positional attributes 260 than the person 1303G. For example, person 1303A is focused on the camera and is making eye contact with the camera, which may be correlated with a high score 280 for the region of interest corresponding to the face of the person 1303A. Similarly, the body of person 1303A is also directly facing the camera, which may also be correlated with a high score 280 for the region of interest corresponding to the body of person 1303A. These high scores 280 may be determined by the portrait image analysis module 125 using the trained data 120.

In contrast, person 1303G is not facing the camera and is not focused on the camera, which may be correlated with a lower score 280 for the region of interest corresponding to the face of person 1303G. This low score may also be determined by the portrait image analysis module 125 using the trained data 120.

In this way, the same image 1300 may have a different aggregate scores 285 based on the selected person 1303A-G. These different aggregate scores 285 may be applied differently when creating summarization videos 1109 and 1112 for different selected people 1303A-G. As described above, a summarization video 1109 having a maximum length may be limited to images 1300 that have an aggregate score 285 higher than a threshold. Therefore, a summarization video 1109 or 1112 having a maximum length for the selected person 1303A may include the image 1300 since the aggregate score 285 for image 1300 having a central focus of person 1303A is high. However, a summarization video 1109 or 1112 having a maximum length for the selected person 1303G may not include (e.g., exclude) the image 1300 since the aggregate score 285 for the image 1300 having a central focus of person 1303G is low.

Figure 14:
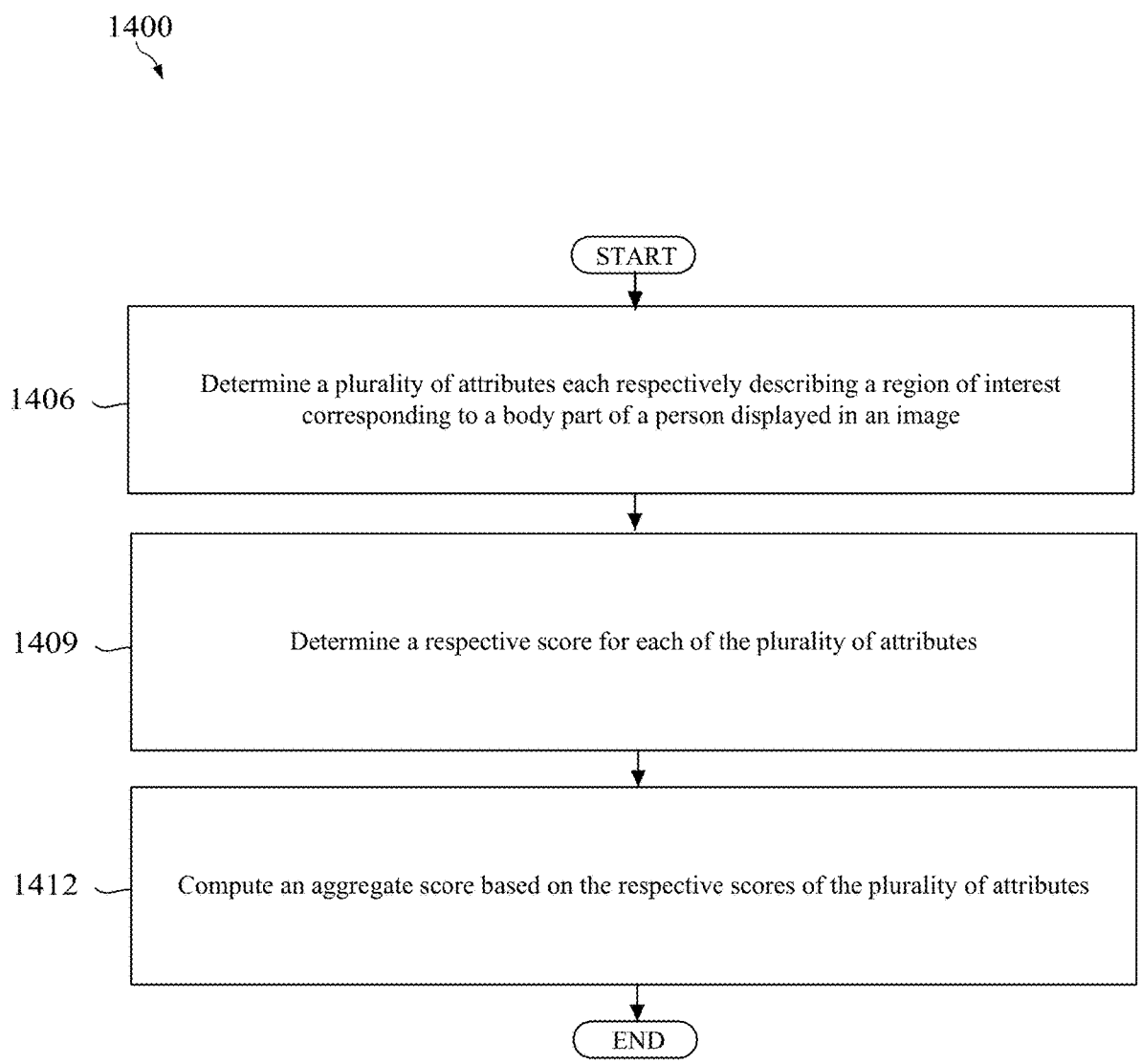
FIG. 14 is a flowchart of a method of performing portrait image analysis based on a person depicted in the image according to various embodiments of the disclosure.

FIG. 14 is a flowchart of method 1400 of performing portrait image analysis based on a person depicted in the image according to various embodiments of the disclosure. Method 1400 may be performed by the portrait image analysis module 125 after obtaining an image 130 or 1300 to be analyzed and scored based on a particular person who is to be the central focus, or protagonist, of the image 130. In an embodiment a selection of a person 1303A displayed in an image 130 or 1300 may be received. In an embodiment, the image 130 or 1300 may be a multi-person portrait image. The processor 205 receives the selection of the person 1303A displayed in the image 130 or 1300. At step 1406, a plurality of attributes 251 that respectively describe a plurality of regions of interest corresponding to a body part of the person displayed in the image 130 or 1300 are determined. The processor 205 executes the portrait image analysis module 125 to determine the attributes 251 in an image 130 or 1300 based on segments identified in the image 130. The attributes 251 identified may be feature attributes 255, positional attributes 260, generic attributes 270, group attributes 265, action behavior attributes 266, objective features of the image 130, and/or other features describing the image 130.

At step 1409, a respective score 280 may be determined for each of the attributes 251. The processor 205 executes the portrait image analysis module 125 to determine a respective score 280 for each of the attributes 251 based on the pre-defined scores 252 stored in the trained data 120. The pre-defined scores 252 are preset scores for various attributes based on prototype images 123. In some embodiments, each of these scores 280 may be weighted according to weights 290 assigned for each of the attributes 251 that are being scored. In an embodiment, the weights 290 for each of the attributes 251 are based on pre-defined weights 253 included in the trained data 120.

At step 1412, an aggregate score 285 is computed based on the respective scores 280 of the attributes 251. The processor 205 executes the portrait image analysis module 125 to compute the aggregate score 285 based on the respective scores 280 of the attributes 251 and the background of the image comprising the plurality of other people 1303B-G. The aggregate scores 285 may be an aggregation of the scores 280 of the attributes 251 for the selected person 1303A. The aggregate scores 285 may also be an aggregation of the scores 280 after being weighted according to the weights 290 of the attributes 251. The aggregate score 285 may also be based on a score 280 assigned to the background of the image 130 based on the trained data 120, in which the background of the image 130 includes the plurality of other people 1303B-G.

Figure 15:
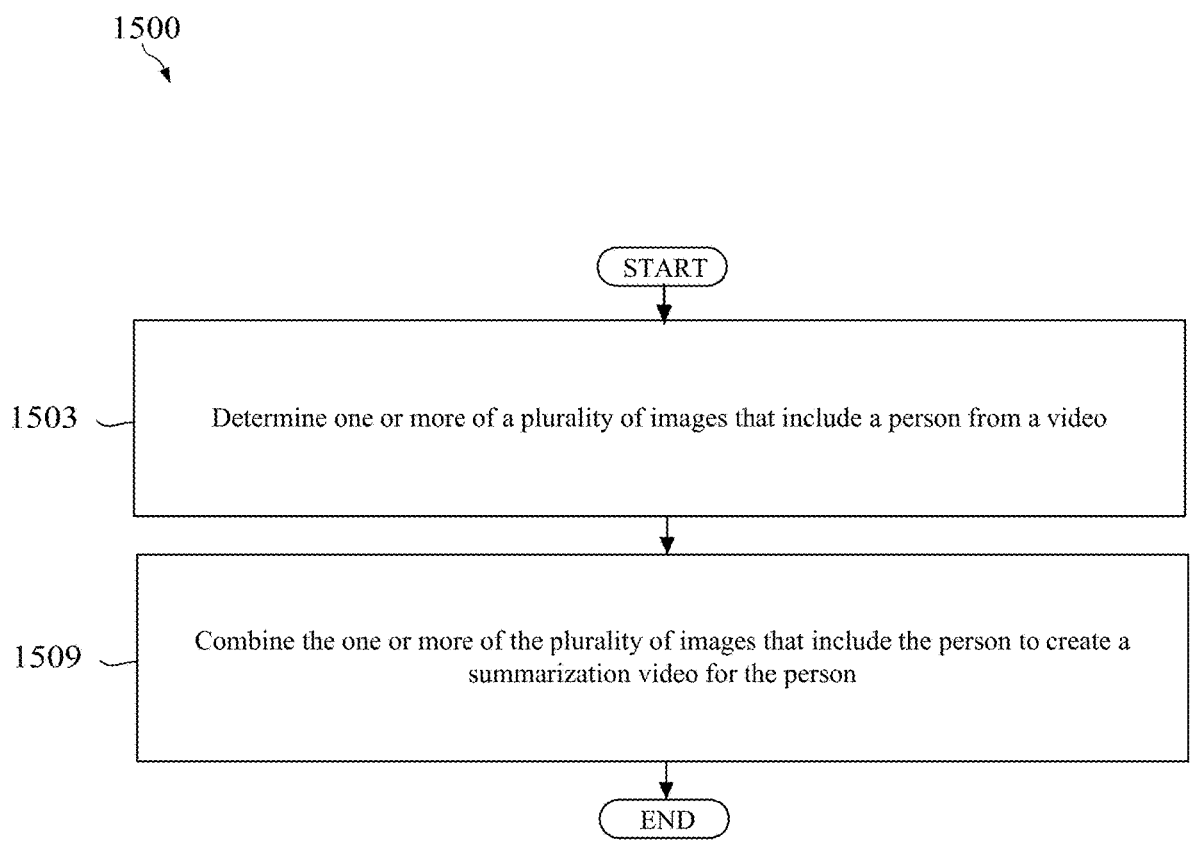
FIG. 15 is a flowchart of a method of creating a summarization video based on a person selected according to various embodiments of the disclosure.

FIG. 15 is a flowchart of method 1500 of creating a summarization video 1109 or 112 based on a person selected according to various embodiments of the disclosure. Method 1400 may be performed by the portrait image analysis module 125 after obtaining an image 130 or 1300 to be analyzed and scored based on a particular person who is to be the central focus, or protagonist, of the image 130.

The summarization videos 1109 and 1112 may be created at any time that the computing device 200 is turned on. In one embodiment, the summarization videos 1109 and 1112 may be created based on the user selection of a person 1303A displayed in an image 130 or 1300 may be received. In one embodiment, a selection of a person 1303A displayed in an image 130 or 1300 may be received, and the image may be one of a plurality of images 130 included in a video. In this embodiment, the image 130 or 1300 may be a multi-person portrait image. The processor 205 receives the selection of the person 1303A displayed in the image 130 or 1300.

In one embodiment, the summarization videos 1109 and 1112 may be created automatically as background activity of the computing device 200 without the user having to select the person 1303A displayed in the image. In this embodiment, the processor 205 may be configured to create the summarization videos 1109 in the background when the computing device 200 is charging or in an idle state (e.g., the screen is off and the user is not using the computing device 200). In the case that the screen or display of the computing device 200 is on, a notification may be displayed on a display of the computing device 200 to indicate that the summarization video 1109 and 112 is creating or has been created.

At step 1503, one or more of the plurality of images 130 or 1300 that include the person 1303A are determined from a video. The one or more of the plurality of images 130 or 1300 are determined based on an aggregate score 285 of each of the plurality of images 130 or 1300. The aggregate score 285 may be computed based only on the attributes 251 of the person 1303A selected. The processor 205 may be configured to determine the one or more of the plurality of images 130 or 1300 that include the person 1303A selected based on the aggregate score 285 of each of the plurality of images 130 or 1300.

At step 1509, the one or more of the plurality of images 130 or 1300 may be combined to create the summarization video 1109 or 1112 for the person 1303A selected. For example, processor 205 may combine the one or more of the plurality of images 130 or 1300 to create the summarization video 1109 or 1112 for the person 1303A selected. While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. The various elements or components may be combined or integrated in another system or certain features may be omitted, or not implemented.

In an embodiment, an apparatus comprises a means for determining a plurality of attributes each respectively describing a region of interest corresponding to a body part of a person displayed in an image, a means for determining a respective score for each of the plurality of attributes, and a means for computing an aggregate score based on the respective scores of the plurality of attributes.

In an embodiment, an apparatus comprises a means for determining one or more of a plurality of images that include a person from a video, and a means for computing the one or more of the plurality of images that include the person to create a summarization video for the person.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
displaying, by a computing device, an information page corresponding to a plurality of images;
receiving, by the computing device, a selection of a person displayed on the information page, the person portrayed in a subset of the plurality of images;
determining, by the computing device, a plurality of attributes, each attribute describing a region of interest corresponding to a body part of the person for each image of the subset, the plurality of attributes comprising a feature attribute and a positional attribute, the feature attribute describing an expression portrayed by the person in the region of interest of the image, and the positional attribute describing a location of the region of interest within the image;

determining, by the computing device for the each image of the subset, a first score for the feature attribute based on a first weight associated with the feature attribute;

determining, by the computing device for the each image of the subset, a second score for the positional attribute based on a second weight associated with the positional attribute;

computing, by the computing device for the each image of the subset, an aggregate score based on a sum of the first score and the second score;

selecting, by the computing device, at least one image of the subset having a highest aggregate score relative to an aggregate score of other images of the subset; and generating, by the computing device, a summarization video for the person, the summarization video including the at least one image of the subset having the highest aggregate score.

2. The method of claim 1, wherein the image portrays the person and a plurality of other people.

3. The method of claim 1, wherein the method further comprises detecting a face of the person.

4. The method of claim 1, wherein a score for each attribute of the plurality of attributes is determined based on trained data that comprises a plurality of pre-defined scores for the each attribute of the plurality of attributes.

5. The method of claim 4, wherein the trained data comprises a plurality of mappings that respectively map one score of the plurality of pre-defined scores with one attribute of a plurality of pre-defined attributes.

6. The method of claim 1, wherein generating the summarization video comprises:

combining, by the computing device, plurality of images of the subset that include the person to create the summarization video for the person.

7. The method of claim 1, wherein the plurality of attributes further comprise a generic attribute of the person, the method further comprising determining, for the each image of the subset, a third score for the generic attribute based on a third weight associated with the generic attribute, the aggregate score being based on a sum of the first score, the second score, and the third score.

8. The method of claim 1, wherein the image displays the person and a plurality of other people, the method further comprising determining, by the computing device, a score for a background of each image of the subset, wherein the aggregate score is computed further based on the score for the background.

9. The method of claim 1, further comprising searching, by the computing device, for the region of interest corresponding to different body parts of the person, the searching based on a likelihood that the body part is positioned at a location within the image.

10. The method of claim 9, wherein searching for the region of interest comprises searching for the region of interest based on trained data, wherein the trained data comprises a pre-defined anchor that points to a specific portion or point in an image.

11. The method of claim 9, wherein searching for the region of interest comprises searching for the region of interest corresponding to at least one of eyes of the person, a nose of the person, or a mouth of the person based on a location of a face of the person in the each image of the subset.

12. The method of claim 1, wherein a plurality of pre-defined scores are respectively stored for the plurality of attributes, the first score being based on trained data for a pre-defined score corresponding to the feature attribute, and the second score being based on trained data for a pre-defined score corresponding to the positional attribute.

13. The method of claim 1, wherein the plurality of attributes comprise a plurality of generic attributes for the person, wherein the plurality of generic attributes describe generic qualities of the person.

14. The method of claim 13, wherein a weight is associated with the plurality of generic attributes.

15. The method of claim 1, wherein the each image of the subset portrays more than one person, the method further comprising determining, by the computing device, a respective score for each group attribute of a plurality of group attributes, wherein the plurality of group attributes describes at least one of a relationship between a plurality of other people portrayed in the each image of the subset, a space between each of the plurality of other people portrayed in the each image of the subset, a gesture performed by one or more of the plurality of other people in the each image of the subset, or an arrangement of the plurality of other people portrayed in the each image of the subset, wherein the aggregate score is further computed based on the each score of the respective scores of the plurality of group attributes.

16. A method, comprising:

displaying, by a computing device, an information page corresponding to a plurality of images;

receiving, by the computing device, a selection of a person displayed on the information page, the person portrayed in a subset of the plurality of images;

determining, by the computing device, a plurality of attributes, each attribute describing a region of interest corresponding to a body part of the person for each image of the subset, the plurality of attributes comprising a feature attribute and a positional attribute, the feature attribute describing an expression portrayed by the person in the region of interest of the image, and the positional attribute describing a location of the region of interest within the image;

determining, by the computing device for the each image of the subset, a first score for the feature attribute based on a first weight associated with the feature attribute;

determining, by the computing device for the each image of the subset, a second score for the positional attribute based on a second weight associated with the positional attribute;

computing, by the computing device for the each image of the subset, an aggregate score based on a sum of the first score and the second score;

selecting, by the computing device, at least one image of the subset having a highest aggregate score relative to an aggregate score of other images of the subset;

generating, by the computing device, a summarization video for the person, the summarization video including the at least one image of the subset having the highest aggregate score; and adding, by the computing device, a thumbnail of the summarization video to the information page.

17. The method of claim 16, further comprising receiving, by the computing device, a selection of a face of the person.

18. The method of claim 16, further comprising detecting multiple faces in the plurality of images.

19. The method of claim 16, wherein the plurality of attributes of the person comprise a plurality of generic attributes for the person, wherein the plurality of generic attributes describe generic qualities of the person.

20. The method of claim 16, wherein the at least one image of the subset is determined based on a first plurality of attributes, each attribute of the first plurality of attributes respectively describing a region of interest corresponding to the body part of the person and a second plurality of attributes that each has lower weight than the first plurality of attributes.

21. The method of claim 16, further comprising:
creating, by the computing device, a thumbnail representing the summarization video for the person, wherein the thumbnail comprises a representative image showing a face of the person; and
displaying, by the computing device, the thumbnail.

22. The method of claim 16, wherein the at least one image of the subset comprises a plurality of summarization images, and wherein the method further comprises adding one or more transition images in between the plurality of summarization images.

23. The method of claim 16, wherein the summarization video is created automatically as background activity of the computing device.

24. The method of claim 16, further comprising displaying, by the computing device, a notification to indicate that the summarization video is being created or has been created.

25. An apparatus, comprising:
memory storage comprising instructions; and
one or more processors in communication with the memory storage, the one or more processors execute the instructions to:
display an information page corresponding to a plurality of images;
receive a selection of a person displayed on the information page, the person portrayed in a subset of the plurality of images;
determine a plurality of attributes, each attribute describing a region of interest corresponding to a body part of the person for each image of the subset, the plurality of attributes comprising a feature attribute and a positional attribute, the feature attribute describing an expression portrayed by the person in the region of interest of the image, and the positional attribute describing a location of the region of interest within the image;
determine, for the each image of the subset, a first score for the feature attribute based on a first weight associated with the feature attribute;
determine, for the each image of the subset, a second score for the positional attribute based on a second weight associated with the positional attribute;
compute, for the each image of the subset, an aggregate score based on a sum of the first score and the second score;
select at least one image of the subset having a highest aggregate score relative to an aggregate score of other images of the subset; and
generate a summarization video for the person, the summarization video including the at least one image of the subset having the highest aggregate score.

26. The apparatus of claim 25, wherein the image displays the person and a plurality of other people.

27. The apparatus of claim 25, wherein the instructions further cause the one or more processors to detect a face of the person in the image.

28. The apparatus of claim 25, wherein the respective score for the each attribute of the plurality of attributes is determined based on trained data that comprises a plurality of pre-defined scores for the each attribute of the plurality of attributes.

29. The apparatus of claim 25, wherein the one or more processors further execute the instructions to search for the region of interest corresponding to different body parts of the person, the search based on a likelihood that the body part is positioned at a location within the each image of the subset.

30. The apparatus of claim 25, wherein the one or more processors further execute the instructions to determine a score for each group attribute of a plurality of group attributes when the image portrays more than one person, wherein the plurality of group attributes describes at least one of a relationship between a plurality of other people portrayed in the each image of the subset, a space between each of the plurality of other people portrayed in the each image of the subset, a gesture performed by one or more of the plurality of other people in the each image of the subset, or an arrangement of the plurality of other people portrayed in the each image of the subset, wherein the aggregate score is further computed based on each score of respective scores of the plurality of group attributes.

31. An apparatus, comprising:
memory storage comprising instructions; and
one or more processors in communication with the memory storage, the one or more processors execute the instructions to:
display an information page corresponding a plurality of images;
receive a selection of a person displayed on the information page, the person portrayed in a subset of the plurality of images;
determine a plurality of attributes, each attribute describing a region of interest corresponding to a body part of the person for each image of the subset, the plurality of attributes comprising a feature attribute and a positional attribute, the feature attribute describing an expression portrayed by the person in the region of interest of the image, and the positional attribute describing a location of the region of interest within the image;
determine, for the each image of the subset, a first score for the feature attribute based on a first weight associated with the feature attribute;
determine, for the each image of the subset, a second score for the positional attribute based on a second weight associated with the positional attribute;
compute, for the each image of the subset, an aggregate score based on a sum of the first score and the second score;
select at least one image of the subset having a highest aggregate score relative to an aggregate score of other images of the subset;
generate a summarization video for the person, the summarization video including the at least one image of the subset having the highest aggregate score; and
add a thumbnail of the summarization video to the information page.

32. The apparatus of claim 31, wherein the one or more processors further execute the instructions to receive a selection of a face the person.

33. The apparatus of claim 31, wherein the one or more processors further execute the instructions to detect multiple faces in the plurality of images.

34. The apparatus of claim 31, wherein the one or more processors further execute the instructions to:
create a thumbnail representing the summarization video for the person, wherein the thumbnail comprises a representative image showing a face of the person; and
cause a display device to display the thumbnail.

35. The apparatus of claim 31, wherein the summarization video is created automatically as background activity of the computing device.

36. The apparatus of claim 31, wherein the summarization video is created automatically when the computing device is charging.

\* \* \* \* \*